US012717935B2

(12) United States Patent
Savaliya et al.

(10) Patent No.: US 12,717,935 B2
(45) Date of Patent: Aug. 25, 2026

(54) INLINE CRYPTOGRAPHIC ENGINE FOR STORAGE CONTROLLERS

(71) Applicant: QUALCOMM Incorporated, San Diego, CA (US)

(72) Inventors: Ankitkumar Parshotambhai Savaliya, Bangalore (IN); Prem Kumar Krishnama Naidu, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 679 days.

(21) Appl. No.: 18/151,445

(22) Filed: Jan. 8, 2023

(65) Prior Publication Data

US 2024/0232388 A1 Jul. 11, 2024

(51) Int. Cl.

*G06F 21/72* (2013.01)
*G06F 21/60* (2013.01)
*G06F 21/85* (2013.01)
*H04L 9/06* (2006.01)

(52) U.S. Cl.

CPC ............ *G06F 21/602* (2013.01); *G06F 21/85* (2013.01); *H04L 9/0631* (2013.01); *H04L 2209/12* (2013.01)

(58) Field of Classification Search

CPC ........ G06F 21/602; G06F 21/85; G06F 21/76; G06F 21/72; H04L 9/0631; H04L 2209/12; H04L 2209/125

See application file for complete search history.

(56) References Cited

U.S. PATENT DOCUMENTS

| | | | | |
|---|---|---|---|---|
| 7,337,314 | B2 * | 2/2008 | Hussain | H04L 63/0428 713/153 |
| 10,020,979 | B1 * | 7/2018 | Oshiba | H04L 43/0876 |
| 2006/0212677 | A1 * | 9/2006 | Fossum | G06F 9/5027 712/1 |
| 2008/0005539 | A1 * | 1/2008 | Velhal | G06F 11/2025 712/220 |
| 2010/0037038 | A1 | 2/2010 | Bieswanger et al. | |

(Continued)

OTHER PUBLICATIONS

International Search Report and Written Opinion—PCT/US2023/083407—ISA/EPO—Mar. 22, 2024. 14 pages.

*Primary Examiner* — Ali S Abyaneh
(74) *Attorney, Agent, or Firm* — Muncy, Geissler, Olds & Lowe, P.C.

(57) ABSTRACT

Various embodiments include methods implemented in an inline cryptographic module of a system on chip (SoC) for inline cryptographic core management. Embodiments may include receiving a cryptographic core configuration request for a data stream of a multi-data stream memory controller, and dynamically configuring at least one cryptographic core for the data stream. Embodiments may include the request being an allocation request for the data stream, activating an available cryptographic core, being the at least one cryptographic core, and allocating the at least one cryptographic core to the data stream. Embodiments may include the request being a deallocation request for the data stream, scanning a plurality of cryptographic cores assigned to the data stream for an indication of an idle state of the at least one cryptographic core, deactivating the at least one cryptographic core, and deallocating the at least one cryptographic core from the data stream.

24 Claims, 11 Drawing Sheets

(56) References Cited

U.S. PATENT DOCUMENTS

| | | | | |
|---|---|---|---|---|
| 2010/0251250 | A1* | 9/2010 | Kishan | G06F 9/4843 718/103 |
| 2012/0166763 | A1* | 6/2012 | Henry | G06F 1/3206 712/E9.004 |
| 2013/0339771 | A1* | 12/2013 | Ryu | G06F 9/5094 713/323 |
| 2015/0363333 | A1* | 12/2015 | Wallace | G06F 13/28 713/193 |
| 2017/0277571 | A1* | 9/2017 | Yoo | G06F 9/5027 |
| 2018/0336068 | A1 | 11/2018 | Sandstrom | |
| 2021/0389875 | A1* | 12/2021 | Segev | G06F 3/0619 |
| 2022/0286399 | A1* | 9/2022 | McDonnell | H04L 47/6275 |

* cited by examiner

INLINE CRYPTOGRAPHIC ENGINE FOR STORAGE CONTROLLERS

BACKGROUND

Memory controllers configured with multiple data streams for memory read and write transaction can implement Advanced Encryption Standard (AES) encryption for the data streams using dedicated AES cores. The design of such memory controllers, including the number of AES cores per data stream, depends on memory throughput requirements. The number of AES cores are provided in the memory controllers through static allocation of the AES cores to respective data streams to achieve the throughput requirements.

SUMMARY

Various aspects include apparatuses and methods for implementing an inline cryptographic module of a system on chip (SoC) for inline cryptographic core management. Aspects may include receiving a cryptographic core configuration request for a data stream of a multi-data stream memory controller, and dynamically configuring at least one cryptographic core for the data stream.

In some aspects, the cryptographic core configuration request may be a cryptographic core allocation request for the data stream. Some aspects may further include activating an available cryptographic core, in which the available cryptographic core may be the at least one cryptographic core, and allocating the at least one cryptographic core to the data stream.

In some aspects, activating the available cryptographic core may include setting an activation value of a data structure for the at least one cryptographic core to indicate an active state of the at least one cryptographic core to the multi-data stream memory controller.

In some aspects, allocating the at least one cryptographic core to the data stream may include setting a reference value of a data structure for the at least one cryptographic core to indicate a link to another cryptographic core allocated to the data stream to the multi-data stream memory controller.

Some aspects may further include aligning another cryptographic core allocated to the data stream. In some aspects, aligning the another cryptographic core allocated to the data stream may include setting a reference value of a data structure for the another cryptographic core to indicate a link to the at least one cryptographic core to the multi-data stream memory controller.

In some aspects, the cryptographic core configuration request may be a cryptographic core deallocation request for the data stream. Some aspects may further include scanning a plurality of cryptographic cores assigned to the data stream for an indication of an idle state of the at least one cryptographic core, deactivating the at least one cryptographic core, and deallocating the at least one cryptographic core from the data stream.

In some aspects, deactivating the at least one cryptographic core may include setting an activation value of a data structure for the at least one cryptographic core to indicate an inactive state of the at least one cryptographic core to the multi-data stream memory controller.

In some aspects, deallocating the at least one cryptographic core from the data stream may include setting a reference value of a data structure for the at least one cryptographic core to indicate a link to no other cryptographic core to the multi-data stream memory controller.

Some aspects may further include aligning a first cryptographic core allocated to the data stream. In some aspects, aligning the first cryptographic core allocated to the data stream may include updating a reference value of a data structure for the first cryptographic core configured to indicate a link to the at least one cryptographic core to the multi-data stream memory controller to being configured to indicate a link to a second cryptographic core allocated to the data stream to the multi-data stream memory controller.

Further aspects include computing devices including an inline cryptographic device configured to perform operations of any of the methods summarized above. Further aspects include computing devices having means for performing any of the functions of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
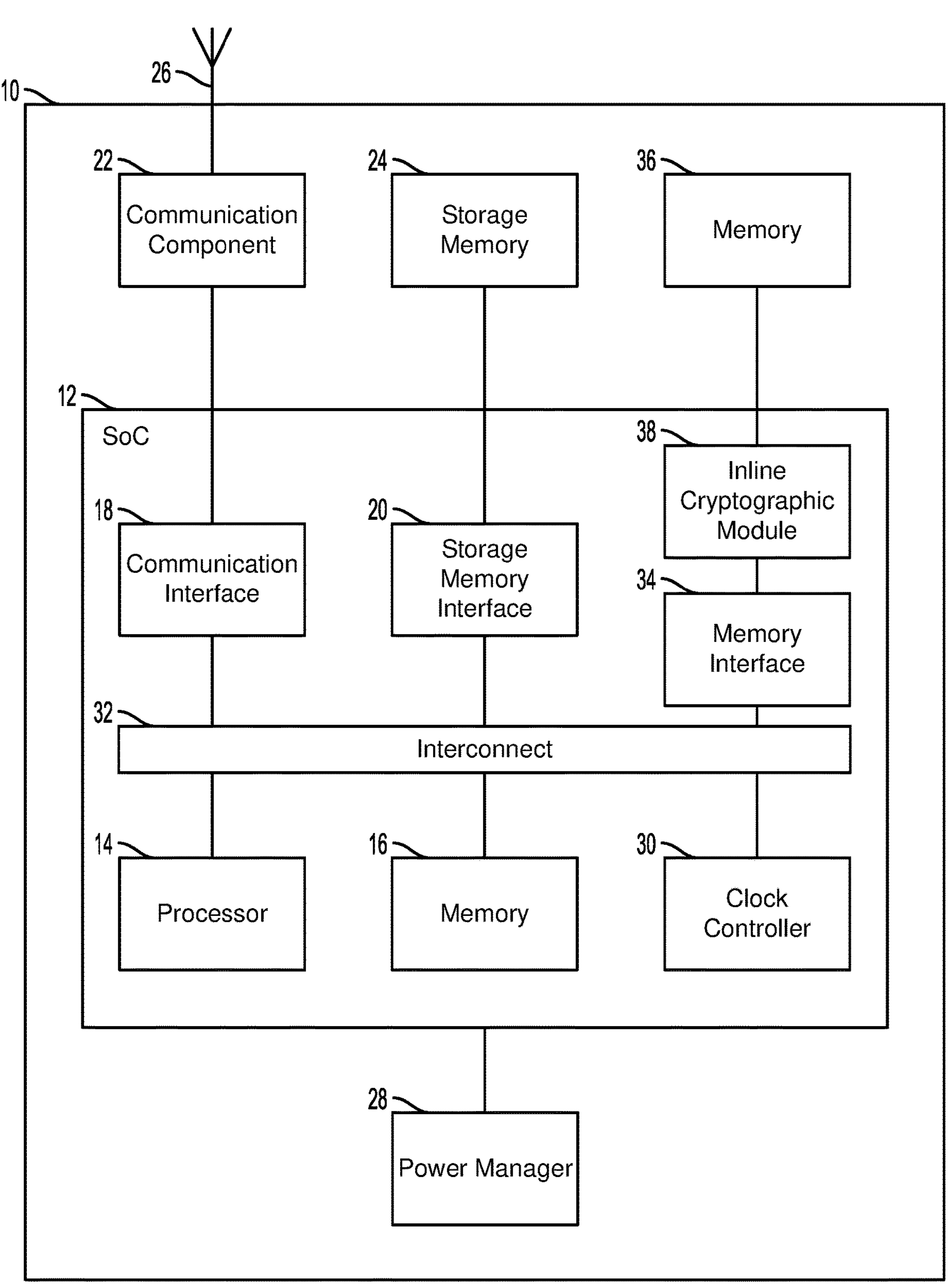
FIG. 1 is a component block diagram illustrating an example computing device suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods, and computing devices implementing such methods, for implementing an inline cryptographic module of a system on chip (SoC) for cryptographic core management. In some embodiments the inline cryptographic module may be configured with processes and/or circuitry for dynamically configuring cryptographic cores for multiple data streams of a multi-data stream memory controller. Dynamic configuration of the cryptographic cores may include allocation and/or deallocation of one or more cryptographic cores to one or more data streams of the multi-data stream memory controller. Dynamic configuration of the cryptographic cores may include allocating a cryptographic core to a data stream by activating an available, or inactive, cryptographic core, and associating the cryptographic core with the data stream and/or at least one other cryptographic core associated with the data stream. Dynamic configuration of the cryptographic cores may include deallocating a cryptographic core from a data stream by deactivating an idle (or about to become idle) cryptographic core associated with the stream, and disassociating the cryptographic core from the data stream and/or at least one other cryptographic core associated with the data stream. Dynamic configuration of the cryptographic cores may include aligning any other cryptographic cores associated with the stream by updating an association of at least one such cryptographic core with regards to at least one other such cryptographic core.

The terms "computing device" and "mobile device" are used interchangeably herein to refer to any one or all of cellular telephones, smartphones, personal or mobile multimedia players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

Memory controllers configured with multiple data streams for memory read and write transaction can implement Advanced Encryption Standard (AES) encryption for the data streams using dedicated AES cores. The design of such memory controllers, including the number of AES cores per data stream, depends on memory throughput requirements. The number of AES cores are provided in the memory controllers through static allocation of the AES cores to respective data streams to achieve the throughput requirements.

The AES cores take up area of the memory controllers circuitry. For example, a cryptographic engine including the AES cores can consume approximately 50% to approximately 60% of the integrated circuit area of a memory controller. Memory technologies are advancing, increasing memory throughputs, which requires increasing the number of statically allocated AES cores and increasing the area of the memory controllers. However, the size of memory controllers may be limited in applications where physical space is limited, making increasing memory controller areas to keep up with memory throughput advances unsustainable.

Increased memory throughput of SoCs after final design, including design of the memory controllers, is limited by the number of statically allocated AES cores of the memory controllers. Such limitations negatively impact performance benchmarks for the SoCs.

Statically allocated AES cores of a memory controller result in inefficient use of resources. For example, not all statically allocated AES cores are required during operation of the memory controller using a particular data stream, leaving some AES cores for the data stream idle. In more extreme examples, all statically allocated AES cores may be idle for an unused data stream. This inefficiency of idle AES cores can be realized across multiple data streams, compounding the inefficiency of the use of statically allocated AES cores.

Various embodiments address and overcome the foregoing problems of statically allocating AES cores to particular data streams of memory controllers by enabling dynamic allocation of cryptographic cores, such as AES cores, to multiple data streams of multi-data stream memory controllers. Dynamic allocation of the cryptographic cores enables use of fewer cryptographic cores to achieve the same and/or higher throughput of the multi-data stream memory controllers than the statically allocated AES cores of the memory controllers. Using fewer dynamically allocated cryptographic cores than statically allocated AES cores reduces the area of the multi-data stream memory controllers for achieving the same and/or higher throughput. Dynamic allocation of the cryptographic cores enables supporting increased memory throughput of SoCs after final design, enabling benchmark performance gains to be realized. Dynamic allocation of the cryptographic cores enables higher efficiency of use of the cryptographic cores than statically allocated AES cores by allowing different data streams to use available cryptographic cores to achieve throughput requirements. Dynamic allocation of the available cryptographic cores to different streams reduces the number of idle cryptographic cores as compared to statically allocated AES cores for the same or similar workloads.

A multi-data stream memory controller may be provided with multiple cryptographic cores that may be dynamically configured, including allocated and/or deallocated, for multiple data streams by a cryptographic core configuration module. Dynamic configuration of the multiple cryptographic cores by the cryptographic core configuration module may be based on throughput requirements for the workloads of the data streams at runtime. Allocation and deallocation may be implemented from and to an available cryptographic core pool of available, or unallocated, cryptographic cores. For example, allocating a cryptographic core to a stream may include allocating an available cryptographic core from the available cryptographic core pool. As another example, deallocating an available cryptographic core from a stream may include making the cryptographic core available in the available cryptographic core pool.

The cryptographic core configuration module dynamic configuring the multiple cryptographic cores may include associating for allocation and/or disassociating for deallocation of cryptographic cores for a stream. For example, a cryptographic core allocated to a stream may be associated with other cryptographic cores allocated to the stream. As another example, a cryptographic core deallocated from a stream may be disassociated from other cryptographic cores allocated to the stream.

FIG. 1 illustrates a system including a computing device 10 suitable for use with various embodiments. The computing device 10 may include a system-on-chip (SoC) 12 with a processor 14, a memory 16, a memory interface 34, an inline cryptographic module 38, a communication interface 18, a storage memory interface 20, a clock controller 30, and an interconnect 32. The computing device 10 may further include a communication component 22, such as a wired or wireless modem, a storage memory 24, an antenna 26 for establishing a wireless communication link, a power manager 28, and a memory 36. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), a secure processing unit (SPU), neural network processing unit (NPU), a subsystem processor of specific components of the computing device, such as an image processor for a camera subsystem or a display processor for a display, an auxiliary processor, a single-core processor, a multicore processor, a controller, and a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The computing device 10 may include any number and combination of memories, such as the memory 16 integral to the SoC 12 and the memory 36 separate from the SoC 12. Any of the memories 16, 36 may be a volatile or non-volatile memory configured for storing data and processor-executable code for access by the processor 14. The computing device 10 and/or SoC 12 may include one or more memories 16, 36 configured for various purposes. One or more memories 16, 36 may include volatile memories such as random access memory (RAM) or main memory, including static RAM (SRAM), such as the memory 16, dynamic RAM (DRAM), such as the memory 36, or cache memory.

The memories 16, 36 may be configured to temporarily store a limited amount of data. For example, the data may be received from a data sensor or subsystem. As another example, the data may be data and/or processor-executable code instructions that are requested from a non-volatile memory 16, 24, 36 loaded to the memories 16, 36 from the non-volatile memory 16, 24, 36 in anticipation of future access based on a variety of factors. As another example, the data may be intermediary processing data and/or processor-executable code instructions produced by the processor 14 and temporarily stored for future quick access without being stored in non-volatile memory 16, 24, 36.

The memory interface 34 may work in unison with the memory 36 to enable the computing device 10 to store and retrieve data and processor-executable code on and from the memory 36. The memory interface 34 may control access to the storage memory 36 and allow the processor 14 to read data from and write data to the memory 36.

The storage memory interface 20 and the storage memory 24 may work in unison to allow the computing device 10 to store data and processor-executable code on a non-volatile storage medium, such as a nonvolatile memory device. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

The inline cryptographic module 38 may be configured to implement cryptographic functions, such as encryption and decryption, of data for transactions of the memory storage device 24. Data transmitted between the memory 36 and the storage memory 24 may be encrypted and decrypted by the inline cryptographic module 38 to secure the data stored and the memory storage device 24 by encrypting the data, and make usable, by the SoC, the encrypted data retrieved from the memory storage device 24 by decrypting the data. The inline cryptographic module 38 may be configured with multiple cryptographic cores (not shown) than the inline cryptographic module 38 may dynamically configure for multiple data streams of a multi-data stream memory controller (not shown). In some implementations, the inline cryptographic module 38 may be a standalone component of the SoC 12. In some implementations, the inline cryptographic module 38 may be integral to another component of the SoC 12, such as the memory interface 34, the storage memory interface 20, the processor 14, the multi-data stream memory controller, etc.

The power manager 28 may be configured to control power states of one or more power rails (not shown) for power delivery to the components of the SoC 12. In some embodiments, the power manager 28 may be configured to control amounts of power provided to the components of the SoC 12. For example, the power manager 28 may be configured to control connections between components of the SoC 12 and the power rails. As another example, the power manager 28 may be configured to control amounts of power on the power rails connected to the components of the SoC 12. The power manager 28 may be configured as a power management integrated circuit (power management ICs or PMIC).

A clock controller 30 may be configured to control clock signals transmitted to the components of the SoC 12. For example, the clock controller 30 may gate a component of the SoC 12 by disconnecting the component of the SoC 12 from a clock signal and may ungate the component of the SoC 12 by connecting the component of the SoC 12 to the clock signal.

The interconnect 32 may be a communication fabric, such as a communication bus, configured to communicatively connect the components of the SoC 12. The interconnect 32 may transmit signals between the components of the SoC 12. In some embodiments, the interconnect 32 may be configured to control signals between the components of the SoC 12 by controlling timing and/or transmission paths of the signals.

Some or all of the components of the computing device 10 and/or the SoC 12 may be arranged differently and/or combined while still serving the functions of the various embodiments. The computing device 10 may not be limited to one of each of the components, and multiple instances of each component may be included in various configurations of the computing device 10.

Figure 2:
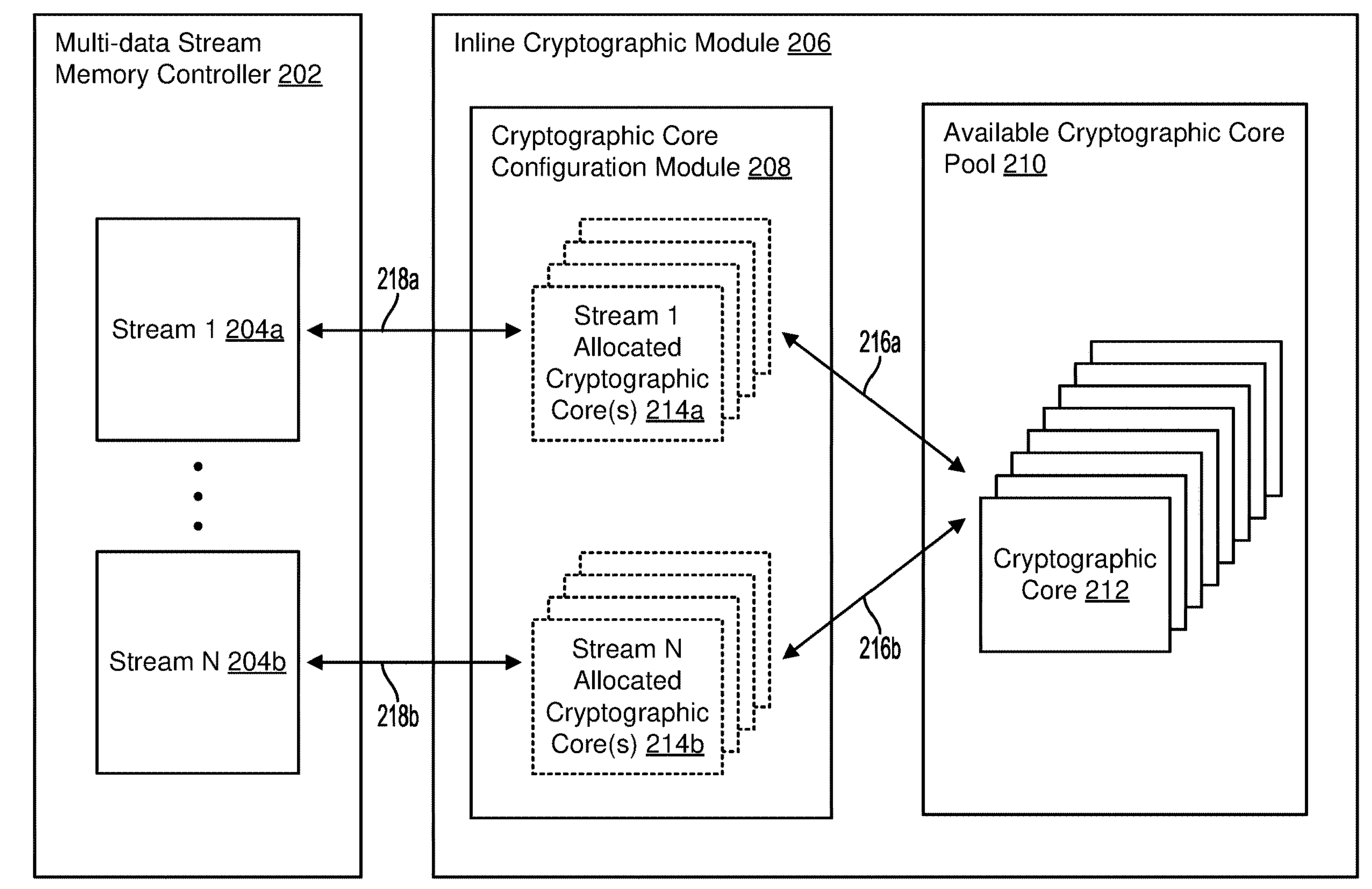
FIG. 2 is a component block diagram illustrating an example inline cryptography multi-data stream memory system suitable for implementing various embodiments.

FIG. 2 illustrates an example of an inline cryptography multi-data stream memory system 200 suitable for implementing various embodiments. With reference to FIGS. 1 and 2, the inline cryptography multi-data stream memory system 200 may include a multi-data stream memory controller 202 and an inline cryptographic module 206 (e.g., inline cryptographic module 38 FIG. 1). In some embodiments, the multi-data stream memory controller 202 and the inline cryptographic module 206 may be separate components of an SoC (e.g., SoC 12 in FIG. 1), which may be standalone components of the SoC and/or integral to other components of the SoC. In some embodiments, the inline cryptographic module 206 may be an integral component of the multi-data stream memory controller 202, which may be a standalone component of the SoC and/or integral to another component of the SoC. Other components of the SoC may include a memory interface (e.g., memory interface 34 in FIG. 1), a storage memory interface 20 (e.g., storage memory interface 20 in FIG. 1), a processor (e.g., processor 14 in FIG. 1), etc. In some embodiments, the inline cryptography multi-data stream memory system 200 may be included in a computing device (e.g., computing device 10 in FIG. 1).

The multi-data stream memory controller 202 may implement multiple data streams 204*a*, 204*b*, such as up to N data streams where N is an integer greater than 1 (e.g., stream 1 204*a*, stream N 204*b*). The multi-data stream memory controller 202 may implement multiple data streams 204*a*, 204*b* for read and/or write transactions between a storage memory (e.g., storage memory 24 in FIG. 1) and a component of the SoC and/or a component of the computing device. For example, the multi-data stream memory controller 202 may implement multiple data streams 204*a*, 204*b* to read data from the storage memory to a component of the SoC, such as a memory (e.g., memory 16 in FIG. 1), the processor, etc. and/or a memory (e.g., memory 36 in FIG. 1) of the computing device that may be standalone from the SoC. As another example, the multi-data stream memory controller 202 may implement multiple data streams 204*a*, 204*b* to write data to the storage memory from a component of the SoC, such as the memory, the processor, etc. and/or the memory of the computing device.

The multi-data stream memory controller 202 may implement read and/or write transactions for workloads with various data throughput requirements using the data streams 204*a*, 204*b* may implement. For example, the multi-data stream memory controller 202 may implement a read and/or write transaction for a workload with a data throughput requirement using the data stream 204*a* that is higher than a data throughput requirement of a workload for which a read and/or write transaction is implemented using the data stream 204*b*.

The inline cryptographic module 206 may include a cryptographic core configuration module 208 and multiple cryptographic cores 212 (e.g., processor 14 in FIG. 1). The cryptographic cores 212 may be configured to implement cryptographic functions for read and/or write data of the data streams 204*a*, 204*b*, such encryption and/or decryption. For example, the cryptographic cores 212 may encrypt data to write from a component of the SoC and/or the memory of the computing device, generating encrypted data for writing to the storage memory. As another example, the cryptographic cores 212 may decrypt data read from the storage memory, generating decrypted data for a component of the SoC and/or the memory of the computing device. The cryptographic cores 212 may be configured to implement cryptographic functions based on any known, proprietary, or future cryptographic algorithms and/or standards. For example, in some embodiments the cryptographic cores 212 may be configured to implement cryptographic functions based on Advanced Encryption Standard (AES).

The cryptographic cores 212 may be logically grouped in an available cryptographic core pool 210 and/or allocated to the data streams 204*a*, 204*b* (e.g., stream 1 allocated cryptographic core(s) 214*a*, stream N allocated cryptographic core(s) 214*b*) by the cryptographic core configuration module 208. In the example illustrated in FIG. 2, the physical cryptographic cores 212 are illustrated using solid lines and the logical allocation of the cryptographic cores 212 are illustrated using broken lines for allocated cryptographic core(s) 214*a*, 214*b*. The cryptographic cores 212 in the available cryptographic core pool 210 may be available for allocation to the data streams 204*a*, 204*b*. In other words, the cryptographic cores 212 in the available cryptographic core pool 210 may be deallocated to the data streams 204*a*, 204*b* and/or may be idle. The stream 1 allocated cryptographic core(s) 214*a* and the stream N allocated cryptographic core(s) 214*b* may be allocated to respective data streams 204*a*, 204*b* for implementing cryptographic functions for read and/or write data of the respective data streams 204*a*, 204*b*. In the example illustrated in FIG. 2, arrows 218*a*, 218*b* illustrate transmission of encrypted read and/or unencrypted write data from the data streams 204*a*, 204*b* to the allocated cryptographic core(s) 214*a*, 214*b*, and of decrypted read data and/or encrypted write data from the allocated cryptographic core(s) 214*a*, 214*b* to the data streams 204*a*, 204*b*.

The cryptographic core configuration module 208, which may be implemented as a hardware component of the inline cryptographic module 206, may include circuitry for configuring the cryptographic cores 212, including circuitry for allocating and deallocating the cryptographic cores 212 to and from data streams 204*a*, 204*b*. Alternatively, cryptographic core configuration module 208 may be a software component of the inline cryptographic module 206 that may include computer code instructions for configuring the cryptographic cores 212. In the example illustrated in FIG. 2, arrows 216*a*, 216*b* illustrate hardware and/or software operations of the cryptographic core configuration module 208 allocating and deallocating the cryptographic cores 212 between the data streams 204*a*, 204*b* and the available cryptographic core pool 210.

Configuration of a cryptographic core 212 for a data stream 204*a*, 204*b* may be implemented as an allocation of the cryptographic core 212 to the data stream 204*a*, 204*b*. The cryptographic core configuration module 208 may identify a cryptographic core 212 in the available cryptographic core pool 210 and allocate the cryptographic core 212 to the data stream 204*a*, 204*b*. When and how many cryptographic cores 212 to allocate to the data stream 204*a*, 204*b* may be determined by the cryptographic core configuration module 208 based on throughput requirements for a workload of the data stream 204*a*, 204*b*.

Allocation of the cryptographic core 212 to the data stream 204*a*, 204*b* may be implemented by logically associating the cryptographic core 212 as an allocated cryptographic core 214*a*, 214*b* with the data stream 204*a*, 204*b*. The association with the data stream 204*a*, 204*b* may be implemented through association of the cryptographic core 212 to itself for an one allocated cryptographic core 214*a*, 214*b* for the data stream 204*a*, 204*b* in implementations with a single cryptographic core or only one cryptographic core for the data stream. The association with the data stream 204*a*, 204*b* may be implemented through association of a first cryptographic core 212 as well as with at least one other allocated cryptographic core 214*a*, 214*b* for the data stream 204*a*, 204*b* in implementations with multiple cryptographic cores in the data structure for the data stream. In some embodiments, allocated cryptographic cores 214*a*, 214*b* may be associated by a data structure that provides references from the allocated cryptographic core 214*a*, 214*b* for the data stream 204*a*, 204*b* to itself as a first and/or only allocated cryptographic core 214*a*, 214*b* for the data stream 204*a*, 204*b* and/or at least one other allocated cryptographic core 214*a*, 214*b* for the same data stream 204*a*, 204*b*. In some embodiments, the references may be stored in a memory (e.g., memory 16 in FIG. 1) (not shown), such as registers at each cryptographic core 212, at the cryptographic core configuration module 208, and/or at the multi-data stream memory controller 202.

Allocation of the cryptographic core 212 to the data stream 204*a*, 204*b* may also be implemented by logically disassociating the cryptographic core 212 from the available cryptographic core pool 210. For example, the cryptographic core 212 may be disassociated from the available cryptographic core pool 210 by the allocation of the cryptographic core 212 as the allocated cryptographic core 214*a*, 214*b* for the data stream 204*a*, 204*b* using the data structure. As another example, the cryptographic core 212 may be disassociated from the available cryptographic core pool 210 by the data structure that provides an activation state of the cryptographic core 212 to the cryptographic core configuration module 208. An activation state indicating to the cryptographic core configuration module 208 that the cryptographic core 212 is in an active state may disassociate the cryptographic core 212 from the available cryptographic core pool 210. In some embodiments, the activation states may be stored in the memory, such as the registers at each cryptographic core 212, at the cryptographic core configuration module 208, and/or at the multi-data stream memory controller 202.

A nonlimiting example of such a data structure is a linked list in which any entry of the link list for the allocated cryptographic core 214*a*, 214*b* may include a reference value to itself as a first and/or only allocated cryptographic core 214*a*, 214*b* for the data stream 204*a*, 204*b* and/or the at least one other allocated cryptographic core 214*a*, 214*b* for the same data stream 204*a*, 204*b*. The reference value may be a cryptographic core identifier (ID) of itself as a first and/or only allocated cryptographic core 214*a*, 214*b* for the data stream 204*a*, 204*b* and/or the at least one other allocated cryptographic core 214*a*, 214*b* for the same data stream 204*a*, 204*b*. The entry for the link list may also include the activation value that may indicate to the cryptographic core configuration module 208 that the cryptographic core 212, that is the allocated cryptographic core 214*a*, 214*b*, is in an active state.

Configuration of a cryptographic core 212 for a data stream 204*a*, 204*b* may be implemented as a deallocation of the cryptographic core 212 from the data stream 204*a*, 204*b*. The cryptographic core configuration module 208 may identify an allocated cryptographic core 214*a*, 214*b* of the data stream 204*a*, 204*b* that is idle and/or will become idle next among the allocated cryptographic cores 214*a*, 214*b* of the data stream 204*a*, 204*b* and deallocate the allocated cryptographic cores 214*a*, 214*b* from the data stream 204*a*, 204*b*. When and how many allocated cryptographic cores 214*a*, 214*b* to deallocate from the data stream 204*a*, 204*b* may be determined by the cryptographic core configuration module 208 based on throughput requirements for a workload of the data stream 204*a*, 204*b* and an activity state of the allocated cryptographic cores 214*a*, 214*b*.

Deallocation of the cryptographic core 212 from the data stream 204*a*, 204*b* may be implemented by logically disassociating the cryptographic core 212 as the allocated cryptographic core 214*a*, 214*b* from the data stream 204*a*, 204*b*. The disassociation from the data stream 204*a*, 204*b* may be implemented through disassociation of the cryptographic core 212 from itself as a last and/or only allocated cryptographic core 214*a*, 214*b* for the data stream 204*a*, 204*b* and/or the at least one other allocated cryptographic core 214*a*, 214*b* for the data stream 204*a*, 204*b*. For example, allocated cryptographic cores 214*a*, 214*b* may be disassociated by the data structure by removing references from the allocated cryptographic core 214*a*, 214*b* for the data stream 204*a*, 204*b* to itself as a last and/or only allocated cryptographic core 214*a*, 214*b* for the data stream 204*a*, 204*b* and/or the at least one other allocated cryptographic core 214*a*, 214*b* for the same data stream 204*a*, 204*b*.

Deallocation of the cryptographic core 212 from the data stream 204*a*, 204*b* may also be implemented by logically associating the cryptographic core 212 with the available cryptographic core pool 210. For example, the cryptographic core 212 may be associated with the available cryptographic core pool 210 by the deallocation of the cryptographic core 212 as the allocated cryptographic core 214*a*, 214*b* for the data stream 204*a*, 204*b* using the data structure. As another example, the cryptographic core 212 may be associated with the available cryptographic core pool 210 by the data structure providing an activation state of the cryptographic core 212 indicating to the cryptographic core configuration module 208 that the cryptographic core 212 is in an inactive state.

A nonlimiting example of such a data structure is a linked list in which any entry of the link list for the cryptographic core 212 may include the reference value to no other allocated cryptographic core 214*a*, 214*b*. The entry for the link list may also include the activation value that may indicate to the cryptographic core configuration module 208 that the cryptographic core 212 is in an inactive state.

The example illustrated in FIG. 2 showing two data streams 204*a*, 204*b* and eight cryptographic cores 212 evenly distributed to the data streams 204*a*, 204*b* is for clarity and ease of explanation, and is not intended to limit the scope of the claims and specification to the number of data streams, number of cryptographic cores, and distribution of cryptographic cores to as shown. Any number of data streams greater than one, any number of cryptographic cores greater than one, and different distributions of cryptographic cores, including distributions of less that all cryptographic cores and/or uneven distributions of cryptographic cores may be implemented by the inline cryptography multi-data stream memory system 200.

Examples of cryptographic core configuration by the cryptographic core configuration module 208 are illustrated in FIGS. 3A-5B, with reference to FIGS. 1-5B. FIGS. 3A-3D illustrate a nonlimiting example of two data streams 300*a*, 300*b* (stream 1 300*a* and stream 2 300*b* in FIGS. 3A-3D) (e.g., data streams 204*a*, 204*b* in FIG. 2), M number of cryptographic cores (e.g., cryptographic cores 212 in FIG. 2), where M is an integer greater than 1, and an available cryptographic core pool 302 (e.g., available cryptographic core pool 210 in FIG. 2).

Figure 3A:
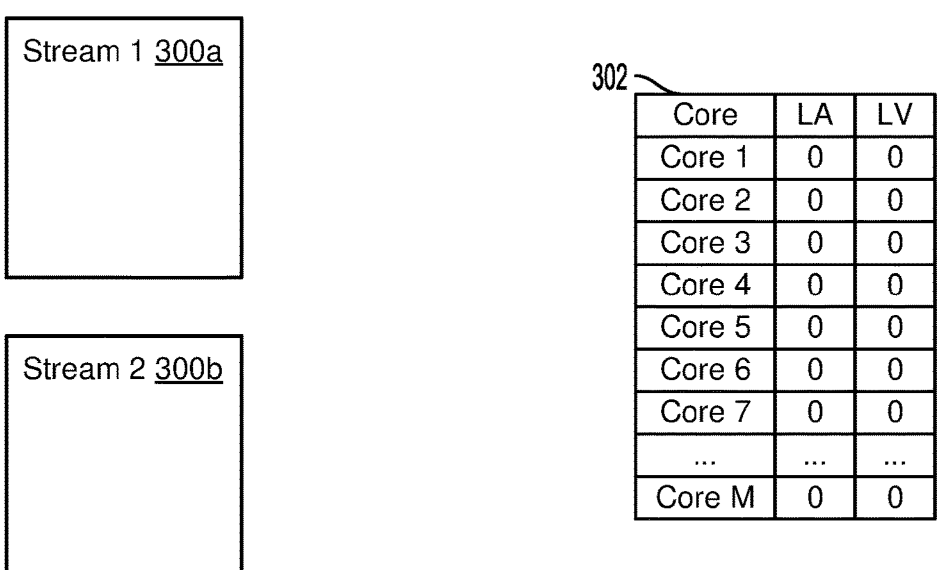
FIGS. 3A-3D are component block diagrams illustrating an example of inline cryptographic core management for a multi-data stream memory controller for implementing various embodiments.

In FIG. 3A, the cryptographic cores are all logically associated with the available cryptographic core pool 302. In other words, none of the cryptographic cores are allocated to the data streams 300*a*, 300*b*. This may be a circumstance where the cryptographic cores have yet to be allocated, such as upon startup, or where the data streams 300*a*, 300*b* do not have a workload requiring the cryptographic cores, such as no workload. The cryptographic cores may be associated with the available cryptographic core pool 302 based on values of the data structure. The values of the data structure may be configured to associate the cryptographic cores with the available cryptographic core pool 302 and/or the data streams 300*a*, 300*b*. Each cryptographic core may have a reference value (link value or LV in FIGS. 3A-5B) configured to indicate to the multi-data stream memory controller (e.g., multi-data stream memory controller 202 in FIG. 2) and the cryptographic core configuration module (e.g., cryptographic core configuration module 208 in FIG. 2) whether the cryptographic core is linked to another cryptographic core and/or to which other cryptographic core the cryptographic core is linked. Each cryptographic core may have an activation value (link active or LA in FIGS. 3A-5B) configured to indicate to the multi-data stream memory controller and the cryptographic core configuration module whether the cryptographic core is active state or inactive state. For example, each cryptographic core may have a reference value that does not reference any other cryptographic core and that indicates no link to another cryptographic core (e.g., LV=0) and/or an activation value that indicates an inactive state (e.g., LA=0).

Figure 3B:
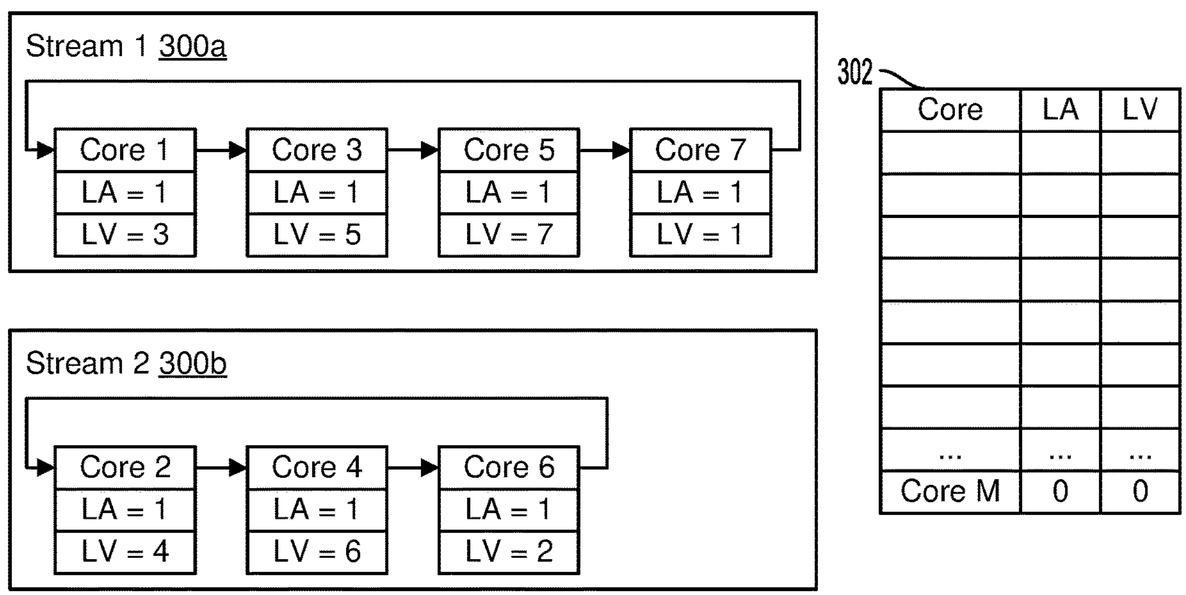

In FIG. 3B, at least some of the cryptographic cores are allocated to the data streams 300*a*, 300*b*. The sequence of allocated cryptographic cores may be dynamically managed at run-time by the cryptographic core configuration module 208 depending on throughput requirements for the workloads of each data stream 300*a*, 300*b*. In the nonlimiting example of FIG. 3B, cryptographic cores 1-7 are disassociated from the available cryptographic core pool 302 and allocated to respective data streams 300*a*, 300*b*. Cryptographic cores 1, 3, 5, and 7 are allocated to data stream 300*a* and cryptographic cores 2, 4, and 6 are allocated to data stream 300*b*.

Cryptographic cores 1, 3, 5, and 7 are allocated to data stream 300*a* based on the respective reference values and activation values of each of cryptographic cores 1, 3, 5, and 7. For example, cryptographic core 1 has a reference value referencing cryptographic core 3 (e.g., LV=3) and an activation value indicating that cryptographic core 1 is active (e.g., LA=1). Similarly, cryptographic core 3 has a reference value referencing cryptographic core 5 (e.g., LV=5), cryptographic core 5 has a reference value referencing cryptographic core 7 (e.g., LV=7), and cryptographic core 7 has a reference value referencing cryptographic core 1 (e.g., LV=1). Each of cryptographic cores 3, 5, and 7 has an activation value indicating that the respective cryptographic core is active (e.g., LA=1). Further, cryptographic cores 2, 4, and 6 are allocated to data stream 300*b* based on the respective reference values and activation values of each of cryptographic cores 2, 4, and 6. For example, cryptographic core 2 has a reference value referencing cryptographic core 4 (e.g., LV=4), cryptographic core 4 has a reference value referencing cryptographic core 6 (e.g., LV=6), and cryptographic core 6 has a reference value referencing cryptographic core 2 (e.g., LV=2). Each of cryptographic cores 2, 4, and 6 has an activation value indicating that the respective cryptographic core is active (e.g., LA=1).

Figure 3C:
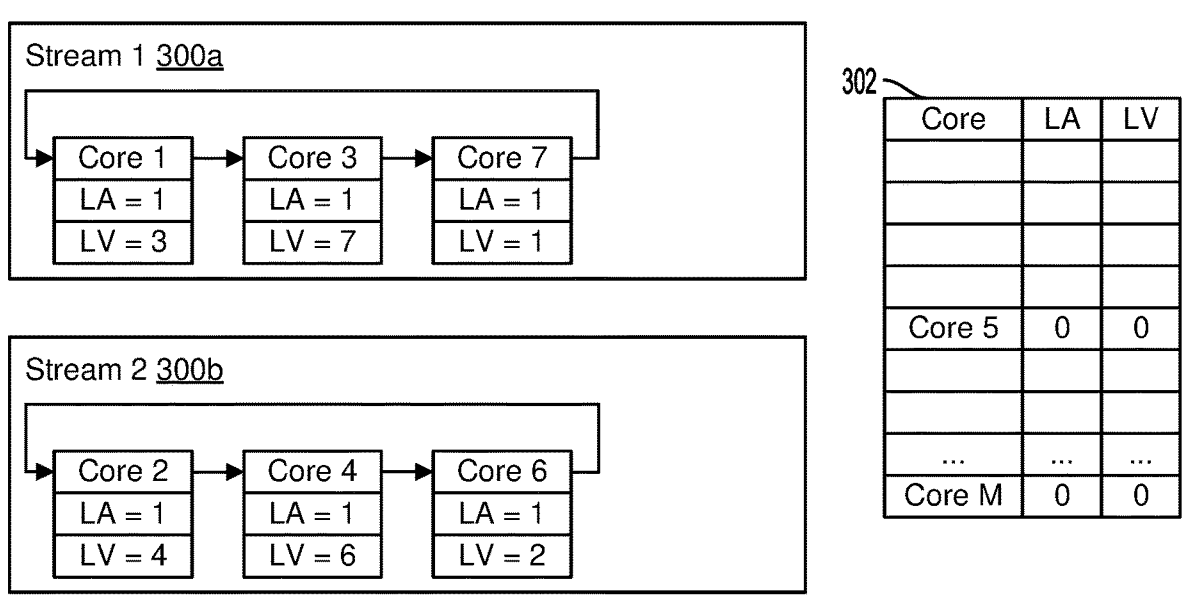

In FIG. 3C, at least some of the allocated cryptographic cores remain allocated to the data streams 300*a*, 300*b* while a cryptographic core is deallocated from the data stream 300*a*. The sequence of deallocated cryptographic cores may be dynamically managed at run-time by the cryptographic core configuration module 208 depending on throughput requirements for the workloads of each data stream 300*a*, 300*b* and an activity state of the cryptographic cores. In the nonlimiting example of FIG. 3C, cryptographic core 5 is deallocated from data stream 300*a* and associated with the available cryptographic core pool 302. The cryptographic core configuration module 208 may determine that one less core is needed to achieve the throughput for the workload of the data stream 300*a* and that cryptographic core 5 is idle and/or will become idle next from among the cryptographic cores allocated to the data stream 300*a*. The cryptographic core configuration module 208 may update associations of the remaining cryptographic cores 1, 3, and 7 allocated to the data stream 300*a*.

Cryptographic core 5 is deallocated from data stream 300*a* based on the respective reference value and activation value of cryptographic core 5. For example, cryptographic core 5 has a reference value referencing no other cryptographic core (e.g., LV=0) and an activation value indicating that cryptographic core 5 is inactive (e.g., LA=0). Deallocation of cryptographic core 5 logically associated cryptographic core 5 with the available cryptographic core pool 302. To compensate for the deallocation of cryptographic core 5 from the data stream 300*a*, the reference value of cryptographic core 3, which previously referenced cryptographic core 5 (e.g., LV=5 in FIG. 3B), is updated to reference cryptographic core 7 (e.g., LV=7) previously referenced by cryptographic core 5.

Figure 3D:
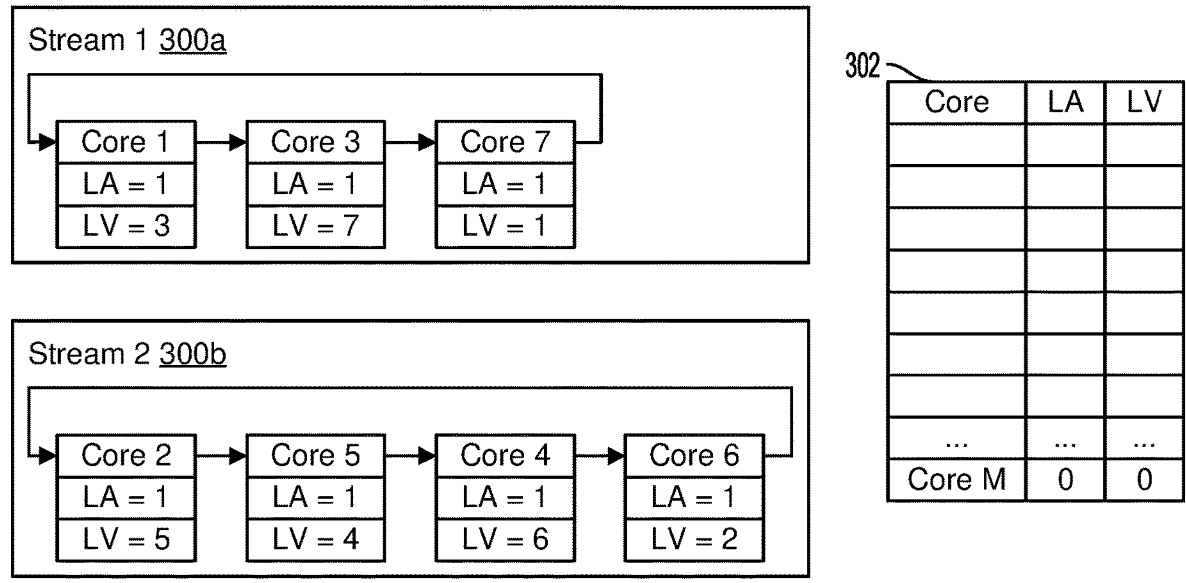
Figure 4A:
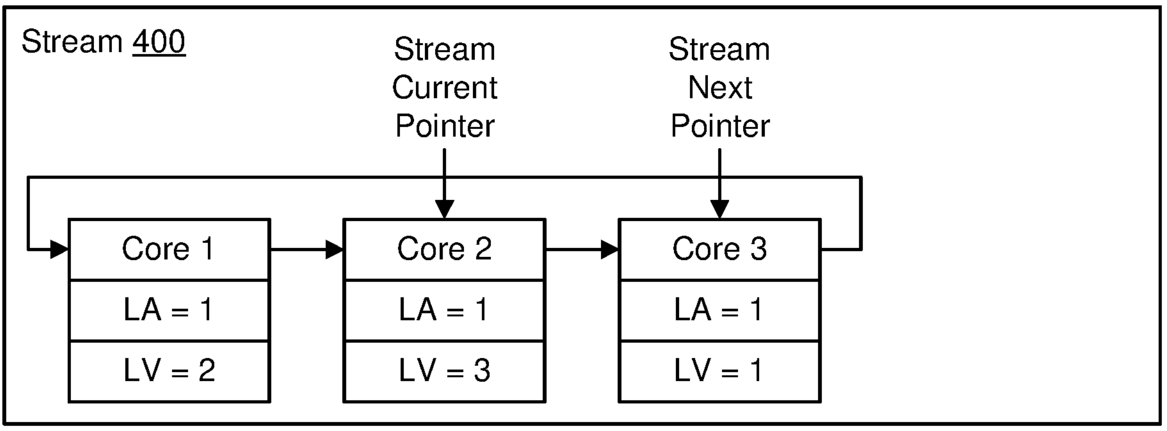
FIGS. 4A and 4B are component block diagrams illustrating an example of inline cryptographic core allocation for the multi-data stream memory controller for implementing various embodiments.
Figure 4B:
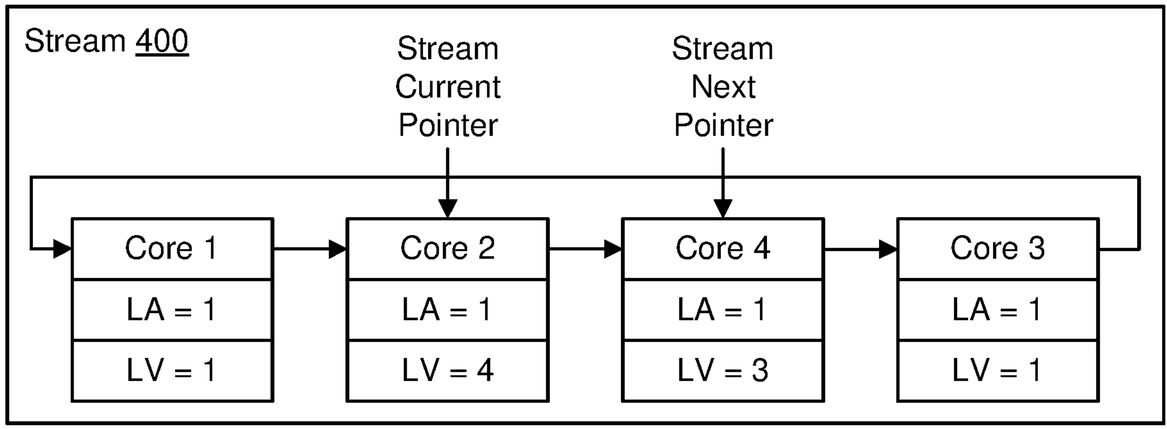
Figure 5A:
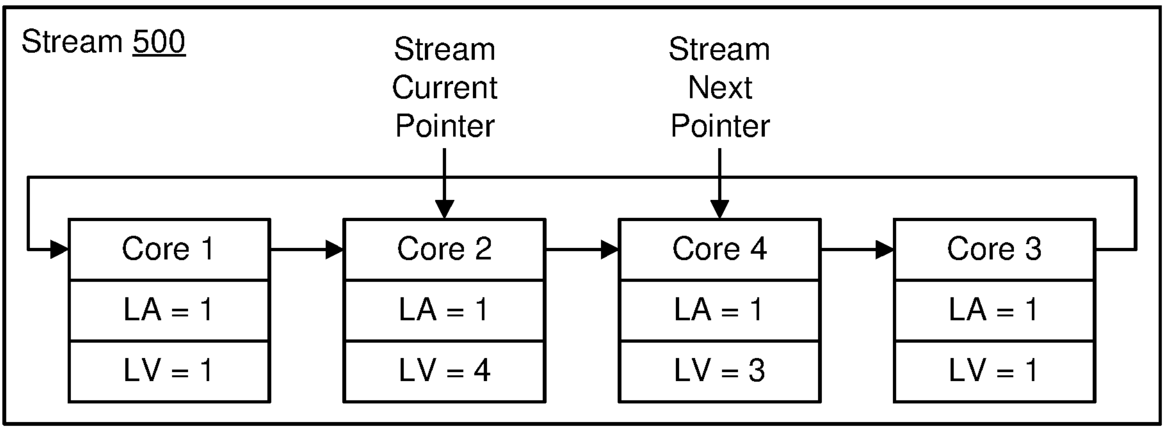
FIGS. 5A and 5B are component block diagrams illustrating an example of inline cryptographic core deallocation for the multi-data stream memory controller for implementing various embodiments.
Figure 5B:
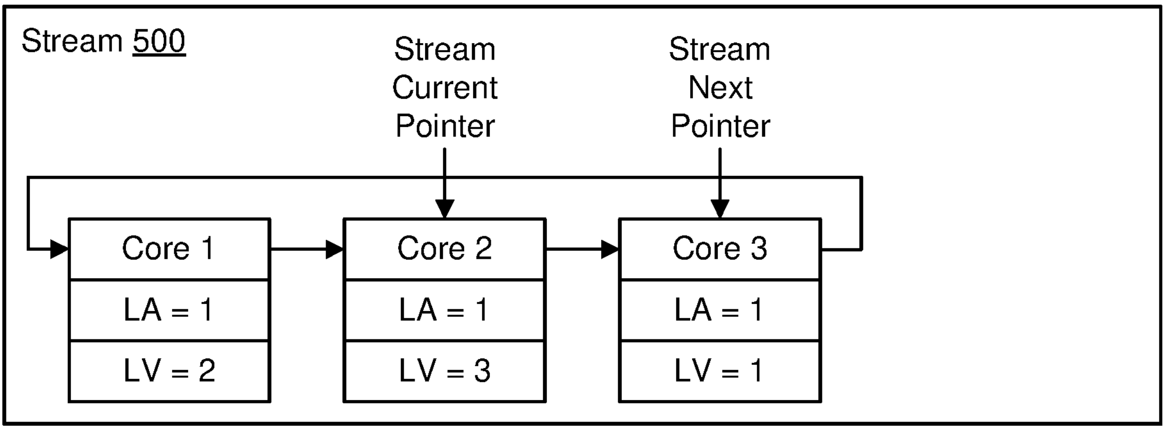

In FIG. 3D, at least some of the cryptographic cores are allocated to the data streams 300*a*, 300*b*. The sequence of allocated cryptographic cores may be dynamically managed at run-time by the cryptographic core configuration module 208 depending on throughput requirements for the workloads of each data stream 300*a*, 300*b*. In the nonlimiting example of FIG. 3D, cryptographic core 5 is disassociated from the available cryptographic core pool 302 and allocated to the data stream 300*b*. The cryptographic core configuration module 208 may update associations of the other cryptographic cores 2, 4, and 6 allocated to the data stream 300*b*.

Cryptographic core 5 is allocated to data stream 300*b* based on the respective reference value and activation value of cryptographic core 5. For example, cryptographic core 5 has a reference value referencing cryptographic core 4 (e.g., LV=4) and an activation value indicating that cryptographic core 1 is active (e.g., LA=1). To compensate for the allocation of cryptographic core 5 to the data stream 300*b*, the reference value of cryptographic core 2, which previously referenced cryptographic core 4 (e.g., LV=4 in FIG. 3C), is updated to reference cryptographic core 5 (e.g., LV=5).

FIGS. 4A-5B illustrate nonlimiting examples of allocation and deallocation of cryptographic cores further including use of stream pointers (e.g., stream current pointer and stream next pointer in FIGS. 4A-5B). A stream current pointer and a stream next pointer may be pointers associated with a data stream 400, 500 (e.g., data stream 204*a*, 204*b*, 300*a*, 300*b* in FIGS. 2-3D). The stream current pointer and the stream next pointer may point to entries in the data structure associating cryptographic cores (e.g., core 1, core 2, core 3, core 4 in FIGS. 4A-5B) with each other and the data stream 400, 500 to which the cryptographic cores are allocated. The stream current pointer and the stream next pointer may be used to direct data for processing to the cryptographic cores of the entries to which they point. Any new incoming data block may be assigned to the cryptographic core associated with the entry to which the stream current pointer points. The cryptographic core associated with the entry to which the stream next pointer points may be next in a sequence to be assigned data. The cryptographic core associated with the entry to which the stream next pointer points may also be the core expected to be idle after the cryptographic core associated with the entry to which the stream current pointer points.

For cryptographic core allocation to the data stream 400, the cryptographic core configuration module 208 may allocate cryptographic core to the data stream 400 by placing the cryptographic core at the location in the data structure to which the stream next pointer points. As such, the newly allocated cryptographic core may be the next cryptographic core in the sequence to be assigned data. In the example of cryptographic core allocation in FIGS. 4A and 4B, cryptographic cores may be previously allocated to the data stream 400 with the stream current pointer pointing to the entry for core 2 and the stream next pointer pointing to the entry for core 3 in FIG. 4A. Core 4 may be allocated to the data stream 400 in FIG. 4B by inserting an entry for core 4 in the data structure at the stream next pointer location and updating the entry for core 2 at the stream current pointer location in the data structure. The entry for core 4 may be configured to reference the entry in the data structure previously pointed to by the stream next pointer, which in this example is the entry for core 3.

For cryptographic core deallocation from the data stream 500, the cryptographic core configuration module 208 may deallocate a cryptographic core from the data stream 500 by removing the cryptographic core from the location in the data structure to which the stream next pointer points. To deallocate the cryptographic core the cryptographic core configuration module 208 may wait until the cryptographic core finishes processing a task. In the example of cryptographic core deallocation in FIGS. 5A and 5B, cryptographic cores may be previously allocated to the data stream 500 with the stream current pointer pointing to the entry for core 2 and the stream next pointer pointing to the entry for core 4 in FIG. 5A. Core 4 may be deallocated from the data stream 500 in FIG. 5B by removing an entry for core 4 from the data structure at the stream next pointer location, updating the stream next pointer, and updating the entry for core 2 at the stream current pointer location in the data structure. The stream next pointer may be updated to point to the entry in the data structure to which the entry for deallocated core 4 previously referenced. In the examples in FIGS. 5A and 5B, the entry for deallocated core 4 previously referenced the entry for core 3, and the stream next pointer may be updated to point to the entry for core 3. The entry for core 2 may be configured to reference to the entry in the data structure pointed to by the stream next pointer, which in this example is the entry for core 3.

Figure 6:
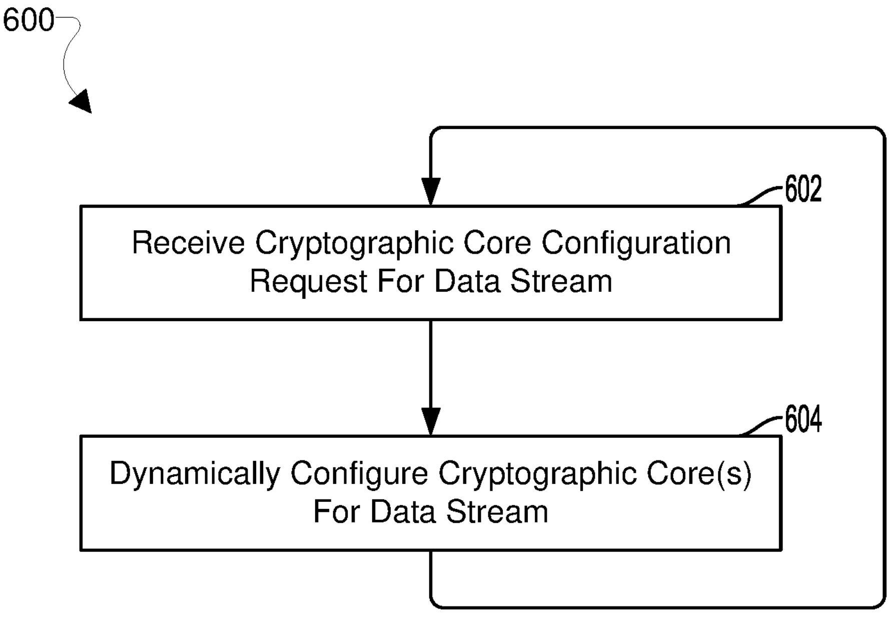
FIG. 6 is a process flows diagram illustrating a method of inline cryptographic core management for the multi-data stream memory controller according to some embodiments.

FIG. 6 illustrates a method of inline cryptographic core management for the multi-data stream memory controller according to some embodiments. With reference to FIGS. 1-6, the method 600 may be implemented in a computing device (e.g., computing device 10 in FIG. 1), in software executing in a processor (e.g., processor 14, inline cryptographic module 38 in FIG. 1, multi-data stream memory controller 202, inline cryptographic module 206, cryptographic core configuration module 208 in FIG. 2), in general purpose hardware, in dedicated hardware (e.g., inline cryptographic module 38 in FIG. 1, multi-data stream memory controller 202, inline cryptographic module 206, cryptographic core configuration module 208 in FIG. 2), or in a combination of a software-configured processor and dedicated hardware, such as a processor executing software within an inline cryptography multi-data stream memory system (e.g., inline cryptography multi-data stream memory system 200 in FIG. 2) that includes other individual components, and various memory/cache controllers. In order to encompass the alternative configurations enabled in various embodiments, the hardware implementing the method 600 is referred to herein as an "inline cryptographic device."

In block 602, the inline cryptographic device may receive a cryptographic core configuration request for a data stream (e.g., data stream 204*a*, 204*b*, 300*a*, 300*b*, 400, 500 in FIGS. 2-5B). The cryptographic core configuration request may be for allocation of cryptographic cores (e.g., cryptographic cores 212 in FIG. 2) to the data stream, described further herein for block 702 of the method 700*a* with reference to FIG. 7A. The cryptographic core configuration request may be for deallocation of cryptographic cores from the data stream, described further herein for block 720 of the method 700*b* with reference to FIG. 7B. In some embodiments, the cryptographic core configuration request may include and/or be associated with a throughput requirement of a workload for which the cryptographic core configuration request is received. In some embodiments, the inline cryptographic device receiving the cryptographic core configuration request for the data stream in block 602 may be a processor (e.g., processor 14 in FIG. 1), an inline cryptographic module (e.g., inline cryptographic module 38, 206 in FIGS. 1 and 2), a multi-data stream memory controller (e.g., multi-data stream memory controller 202 in FIG. 2), and/or a cryptographic core configuration module (e.g., cryptographic core configuration module 208 in FIG. 2).

In block 604, the inline cryptographic device may dynamically configure at least one cryptographic core for the data stream. In some embodiments, the inline cryptographic device may allocate the at least one cryptographic core to the data stream having no other allocated cryptographic cores. In some embodiments, the inline cryptographic device may allocate the at least one cryptographic core to the data stream having at least one other allocated cryptographic core. Allocating the at least one cryptographic core to the data stream is described further herein with reference to blocks 704-712 of the method 700*a* illustrated in FIG. 7A. In some embodiments, the inline cryptographic device may deallocate the at least one cryptographic core from the data stream having no other allocated cryptographic cores. In some embodiments, the inline cryptographic device may deallocate the at least one cryptographic core from the data stream having at least one other allocated cryptographic core. Deallocating the at least one cryptographic core from the data stream is described further herein with reference to blocks 722-732 of the method 700*b* illustrated in FIG. 7B. In some embodiments, the inline cryptographic device dynamically configuring the at least one cryptographic core for the data stream in block 604 may be the processor, the inline cryptographic module, the multi-data stream memory controller, and/or the cryptographic core configuration module.

Figure 7A:
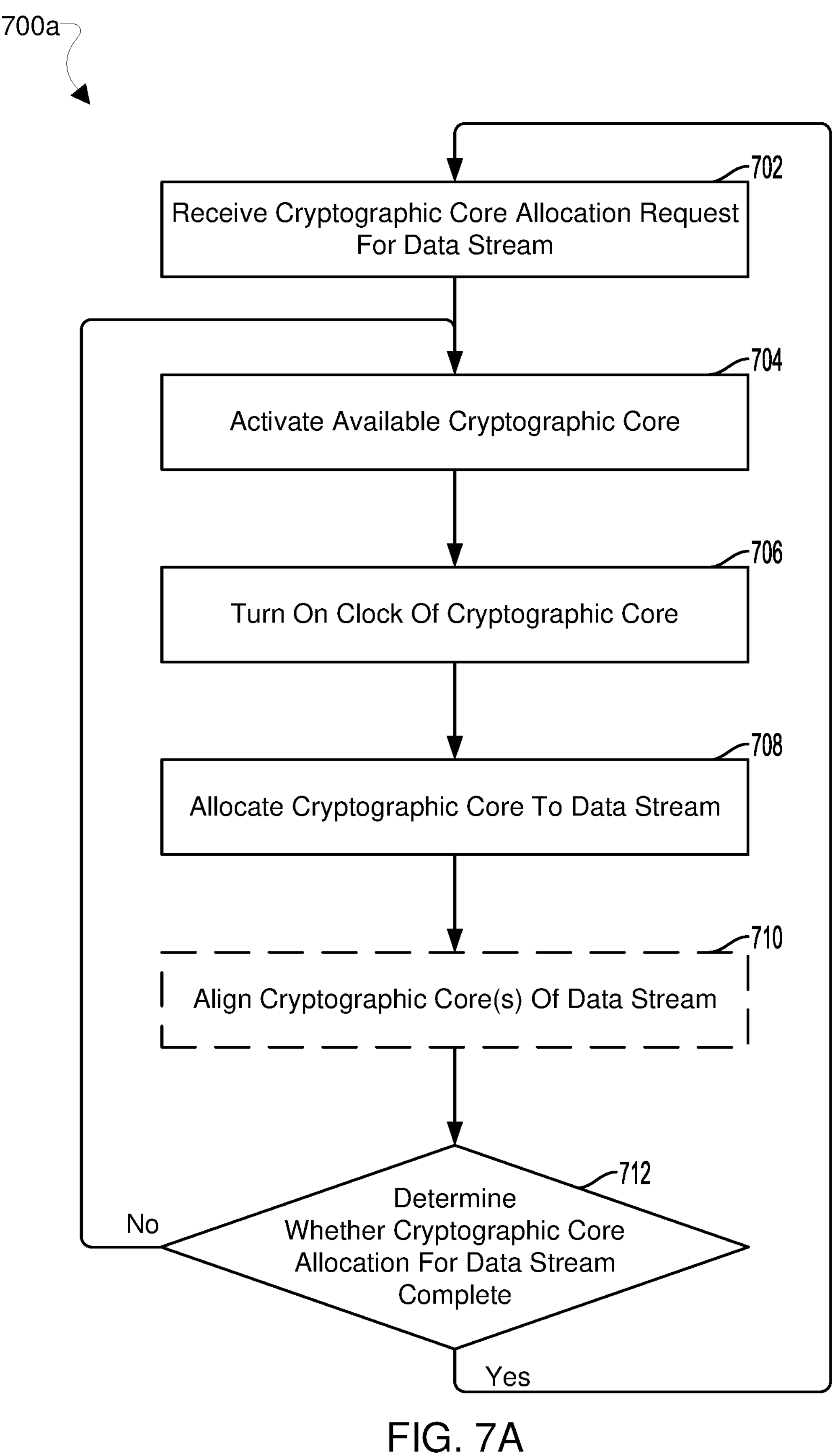
FIGS. 7A and 7B are process flows diagram illustrating methods of inline cryptographic core management for the multi-data stream memory controller according to some embodiments.
Figure 7B:
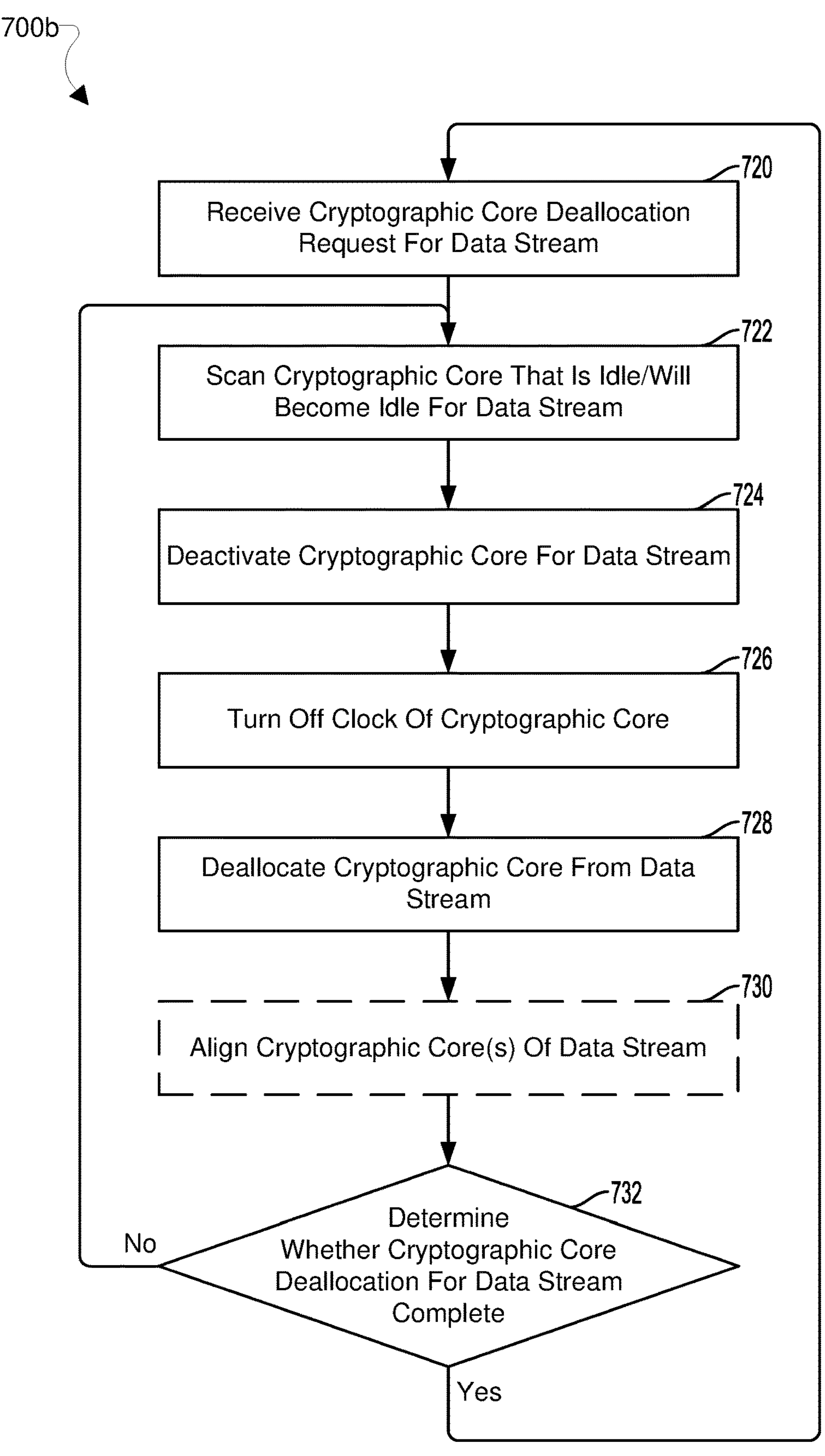

FIGS. 7A and 7B illustrate methods of inline cryptographic core management for the multi-data stream memory controller according to some embodiments. With reference to FIGS. 1-7B, the methods 700*a*, 700*b* may be implemented in a computing device (e.g., computing device 10 in FIG. 1), in software executing in a processor (e.g., processor 14, inline cryptographic module 38 in FIG. 1, multi-data stream memory controller 202, inline cryptographic module 206, cryptographic core configuration module 208 in FIG. 2), in general purpose hardware, in dedicated hardware (e.g., inline cryptographic module 38 in FIG. 1, multi-data stream memory controller 202, inline cryptographic module 206, cryptographic core configuration module 208 in FIG. 2), or in a combination of a software-configured processor and dedicated hardware, such as a processor executing software within an inline cryptography multi-data stream memory system (e.g., inline cryptography multi-data stream memory system 200 in FIG. 2) that includes other individual components, and various memory/cache controllers. In order to encompass the alternative configurations enabled in various embodiments, the hardware implementing the methods 700*a*, 700*b* is referred to herein as an "inline cryptographic device."

With reference to FIG. 7A, for the method 700*a*, in block 702, the inline cryptographic device may receive a cryptographic core allocation request for a data stream (e.g., data stream 204*a*, 204*b*, 300*a*, 300*b*, 400, 500 in FIGS. 2-5B). The cryptographic core allocation request may be received from a processor (e.g., processor 14 in FIG. 1) for configuring at least one cryptographic core (e.g., cryptographic core 212 in FIG. 2) for a workload to be executed using the data stream for read transactions and/or write transactions between a storage memory (e.g., storage memory 24 in FIG. 1) and a component of an SoC (e.g., SoC 12 in FIG. 1) and/or a component of the computing device. The components of the SoC may include a memory (e.g., memory 16 in FIG. 1), a memory interface (e.g., memory interface 34 in FIG. 1), a storage memory interface 20 (e.g., storage memory interface 20 in FIG. 1), a processor (e.g., processor 14 in FIG. 1), etc. A component of the computing device may include a memory (e.g., memory 36 in FIG. 1) that may be standalone from the SoC. The cryptographic core allocation request may include and/or be associated with a throughput requirement for implementing to the workload. The inline cryptographic device may base how many cryptographic cores to allocate to the data stream based on the throughput requirement. In some embodiments, the inline cryptographic device receiving the cryptographic core allocation request for the data stream in block 702 may be a processor (e.g., processor 14 in FIG. 1), an inline cryptographic module (e.g., inline cryptographic module 38, 206 in FIGS. 1 and 2), a multi-data stream memory controller (e.g., multi-data stream memory controller 202 in FIG. 2), and/or a cryptographic core configuration module (e.g., cryptographic core configuration module 208 in FIG. 2).

In block 704, the inline cryptographic device may activate an available cryptographic core. The inline cryptographic device may select a cryptographic core logically associated with an available cryptographic core pool (e.g., available cryptographic core pool 210 in FIG. 2) to activate. For example, the inline cryptographic device may select a cryptographic core associated with an activation value, stored in a memory (e.g., memory 16 in FIG. 1), such as a register, set to indicate to the inline cryptographic device that the cryptographic core is in an inactive state, or available. The inline cryptographic device may activate the selected cryptographic core by setting the activation value to a value set to indicate to the inline cryptographic device that the cryptographic core is in an active state. In some embodiments, the inline cryptographic device activating the available cryptographic core in block 704 may be the processor, the inline cryptographic module, the multi-data stream memory controller, and/or the cryptographic core configuration module.

In block 706, the inline cryptographic device may turn on a clock for the cryptographic core. The inline cryptographic device may signal to a clock controller for the cryptographic core to provide clock signals to the cryptographic core. In some embodiments, the inline cryptographic device turning on the clock for the cryptographic core in block 706 may be the processor, the inline cryptographic module, the multi-data stream memory controller, and/or the cryptographic core configuration module.

In block 708, the inline cryptographic device may allocate the cryptographic core to the data stream. To allocate the cryptographic core to the data stream, the inline cryptographic device may include an entry for the cryptographic core to a data structure for the data stream, where the data structure may be configured to associate any number of cryptographic cores allocated to the data stream with each other. For example, the inline cryptographic device may set a reference value, stored in a memory (e.g., memory 16 in FIG. 1), such as a register, set to indicate to the inline cryptographic device that the entry for cryptographic core references an entry for itself as a first and/or only cryptographic core of the data structure for the data stream and/or another cryptographic core of the data structure for the data stream. The reference value may be a cryptographic core ID of the first cryptographic core and/or the other cryptographic core. In some embodiments, the inline cryptographic device allocating the cryptographic core to the data stream in block 708 may be the processor, the inline cryptographic module, the multi-data stream memory controller, and/or the cryptographic core configuration module.

In optional block 710, the inline cryptographic device may align at least one other cryptographic core allocated to the data stream. Optional block 710 may be implemented for circumstances having multiple cryptographic cores in the data structure for the data stream. An entry for the at least one other cryptographic core in the data structure for the data stream may be updated to set the reference value of the entry for the at least one other cryptographic core to reference the entry for the cryptographic core allocated in block 708. For example, the at least one other cryptographic core may have an entry in the data structure of the data stream referencing the entry for the cryptographic core that the entry for the cryptographic core allocated in block 708 now references. The reference value of the entry for the at least one other cryptographic core may be updated to now reference the entry for the cryptographic core allocated in block 708. In some embodiments, the inline cryptographic device aligning the at least one other cryptographic core allocated to the data stream in optional block 710 may be the processor, the inline cryptographic module, the multi-data stream memory controller, and/or the cryptographic core configuration module.

In determination block 712, the inline cryptographic device may determine whether cryptographic core allocation for the data stream is complete. The inline cryptographic device may determine how many cryptographic cores to allocate to the data stream based on the throughput requirements for the workload for which the cryptographic core allocation request for the data stream was received in block 702. The inline cryptographic device may track the cryptographic cores allocated to the data stream, such as based on the data structure for the data stream. Using information of the cryptographic cores allocated to the data stream, the inline cryptographic device may determine whether sufficient cryptographic cores are allocated to the data stream to achieve the throughput requirements. For example, the inline cryptographic device may compare a number and/or capability of cryptographic cores allocated to the data stream with a number and/or capability of cryptographic cores for achieving the throughput requirements. For a number and/or capability of cryptographic cores allocated to the data stream capable of achieving the throughput requirements, the inline cryptographic device may determine that cryptographic core allocation for the data stream is complete. For a number and/or capability of cryptographic cores allocated to the data stream incapable of achieving the throughput requirements, the inline cryptographic device may determine that cryptographic core allocation for the data stream is not complete. In some embodiments, the inline cryptographic device determining whether cryptographic core allocation for the data stream is complete in determination block 712 may be the processor, the inline cryptographic module, the multi-data stream memory controller, and/or the cryptographic core configuration module.

In response to determining that cryptographic core allocation for the data stream is not complete (i.e., determination block 712="No"), the inline cryptographic device may activate an available cryptographic core in block 704. In some embodiments, the inline cryptographic device activating the available cryptographic core in block 704 may be the processor, the inline cryptographic module, the multi-data stream memory controller, and/or the cryptographic core configuration module.

In response to determining that cryptographic core allocation for the data stream is complete (i.e., determination block 712="Yes"), the inline cryptographic device may receive a cryptographic core allocation request for a data stream in block 702. In some embodiments, the inline cryptographic device receiving the cryptographic core allocation request for the data stream in block 702 may be the processor, the inline cryptographic module, the multi-data stream memory controller, and/or the cryptographic core configuration module.

Referring to FIG. 7B, in the method 700*b*, the inline cryptographic device may receive a cryptographic core deallocation request for a data stream (e.g., data stream 204*a*, 204*b*, 300*a*, 300*b*, 400, 500 in FIGS. 2-5B) in block 720. The cryptographic core deallocation request may be received from a processor (e.g., processor 14 in FIG. 1) for configuring at least one cryptographic core (e.g., cryptographic core 212 in FIG. 2) for a workload to be executed using the data stream for read transactions and/or write transactions between a storage memory (e.g., storage memory 24 in FIG. 1) and a component of an SoC (e.g., SoC 12 in FIG. 1) and/or a component of the computing device. The components of the SoC may include a memory (e.g., memory 16 in FIG. 1), a memory interface (e.g., memory interface 34 in FIG. 1), a storage memory interface 20 (e.g., storage memory interface 20 in FIG. 1), a processor (e.g., processor 14 in FIG. 1), etc. A component of the computing device may include a memory (e.g., memory 36 in FIG. 1) that may be standalone from the SoC. The cryptographic core deallocation request may include and/or be associated with a throughput requirement for implementing to the workload. The inline cryptographic device may base how many cryptographic cores to deallocate from the data stream based on the throughput requirement. In some embodiments, the inline cryptographic device receiving the cryptographic core deallocation request for the data stream in block 720 may be a processor (e.g., processor 14 in FIG. 1), an inline cryptographic module (e.g., inline cryptographic module 38, 206 in FIGS. 1 and 2), a multi-data stream memory controller (e.g., multi-data stream memory controller 202 in FIG. 2), and/or a cryptographic core configuration module (e.g., cryptographic core configuration module 208 in FIG. 2).

In block 722, the inline cryptographic device may scan for cryptographic cores that are idle and/or are to become idle for the data stream. In some embodiments, the inline cryptographic device may analyze the tasks scheduled and/or being executed by the cryptographic cores allocated to the data stream to determine which are idle (e.g., have no tasks) and/or which are to become idle (e.g., have a fewest number of tasks). In some embodiments, the inline cryptographic device may assume that a cryptographic core is to become idle based on a relation in the data structure allocating the cryptographic cores to the data stream relative to a cryptographic core receiving and/or executing tasks. For example, a cryptographic core referenced by a cryptographic core receiving and/or executing tasks may be assumed to be idle next. In some embodiments, the inline cryptographic device scanning for the cryptographic cores that are idle and/or are to become idle for the data stream in block 722 may be the processor, the inline cryptographic module, the multi-data stream memory controller, and/or the cryptographic core configuration module.

In block 724, the inline cryptographic device may deactivate a cryptographic core. The inline cryptographic device may select a cryptographic core that is idle and/or is to become idle to deactivate. In some embodiments, the cryptographic core may be associated with an activation value, stored in a memory (e.g., memory 16 in FIG. 1), such as a register, set to indicate to the inline cryptographic device that the cryptographic core is in an active state, or active. The inline cryptographic device may deactivate the cryptographic core by setting the activation value to a value set to indicate to the inline cryptographic device that the cryptographic core is in an inactive state. In some embodiments, the inline cryptographic device deactivating the cryptographic core in block 724 may be the processor, the inline cryptographic module, the multi-data stream memory controller, and/or the cryptographic core configuration module.

In block 726, the inline cryptographic device may turn off a clock for the cryptographic core. The inline cryptographic device may signal to a clock controller for the cryptographic core to cease providing clock signals to the cryptographic core. In some embodiments, the inline cryptographic device turning off the clock for the cryptographic core in block 726 may be the processor, the inline cryptographic module, the multi-data stream memory controller, and/or the cryptographic core configuration module.

In block 728, the inline cryptographic device may deallocate the cryptographic core from the data stream. To deallocate the cryptographic core from the data stream, the inline cryptographic device may remove an entry for the cryptographic core from a data structure for the data stream, in which the data structure may be configured to associate any number of cryptographic cores allocated to the data stream with each other. For example, the inline cryptographic device may set a reference value, stored in a memory (e.g., memory 16 in FIG. 1), such as a register, set to indicate to the inline cryptographic device that the entry for cryptographic core references no other entry for another cryptographic core of the data structure for the data stream. The reference value may be a value not used as cryptographic core ID of any other cryptographic core. In some embodiments, the inline cryptographic device deallocating the cryptographic core to the data stream in block 728 may be the processor, the inline cryptographic module, the multi-data stream memory controller, and/or the cryptographic core configuration module.

In optional block 730, the inline cryptographic device may align at least one other cryptographic core allocated to the data stream. Optional block 730 may be implemented for circumstances having multiple cryptographic cores in the data structure for the data stream. An entry for the at least one other cryptographic core in the data structure for the data stream may be updated to set the reference value of the entry for the at least one other cryptographic core to reference an entry for a cryptographic core that the entry for the deallocated cryptographic core previously referenced. For example, the at least one other cryptographic core may have an entry in the data structure of the data stream referencing the prior entry for the deallocated cryptographic core. The reference value of the entry for the at least one other cryptographic core may be updated to now reference the entry for the cryptographic core that the entry for the deallocated cryptographic core previously referenced. In some embodiments, the inline cryptographic device aligning the at least one other cryptographic core allocated to the data stream in optional block 730 may be the processor, the inline cryptographic module, the multi-data stream memory controller, and/or the cryptographic core configuration module.

In determination block 732, the inline cryptographic device may determine whether cryptographic core deallocation for the data stream is complete. The inline cryptographic device may determine how many cryptographic cores to deallocate from the data stream based on the throughput requirements for the workload for which the cryptographic core deallocation request for the data stream was received in block 720. The inline cryptographic device may track the cryptographic cores allocated to the data stream, such as based on the data structure for the data stream. Using information of the cryptographic cores allocated to the data stream, the inline cryptographic device may determine whether sufficient cryptographic cores are deallocated from the data stream to achieve the throughput requirements. For example, the inline cryptographic device may compare a number and/or capability of cryptographic cores allocated to the data stream with a number and/or capability of cryptographic cores for achieving the throughput requirements. For a number and/or capability of cryptographic cores allocated to the data stream capable of exceeding the throughput requirements, the inline cryptographic device may determine that cryptographic core deallocation for the data stream is not complete.

In some embodiments, exceeding the throughput requirements may include exceeding the throughput requirements by more than a designated margin. For a number and/or capability of cryptographic cores allocated to the data stream capable of achieving the throughput requirements, the inline cryptographic device may determine that cryptographic core allocation for the data stream is complete. In some embodiments, achieving the throughput requirements may include exceeding the throughput requirement by less than designated margin. In some embodiments, the inline cryptographic device determining whether cryptographic core deallocation for the data stream is complete in determination block 732 may be the processor, the inline cryptographic module, the multi-data stream memory controller, and/or the cryptographic core configuration module.

In response to determining that cryptographic core deallocation for the data stream is not complete (i.e., determination block 732="No"), the inline cryptographic device may scan for the cryptographic cores that are idle and/or are to become idle for the data stream in block 722. In some embodiments, the inline cryptographic device scanning for the cryptographic cores that are idle and/or are to become idle for the data stream in block 722 may be the processor, the inline cryptographic module, the multi-data stream memory controller, and/or the cryptographic core configuration module.

In response to determining that cryptographic core deallocation for the data stream is complete (i.e., determination block 732="Yes"), the inline cryptographic device may receive a cryptographic core deallocation request for a data stream in block 720. In some embodiments, the inline cryptographic device receiving the cryptographic core deallocation request for the data stream in block 720 may be the processor, the inline cryptographic module, the multi-data stream memory controller, and/or the cryptographic core configuration module.

Figure 8:
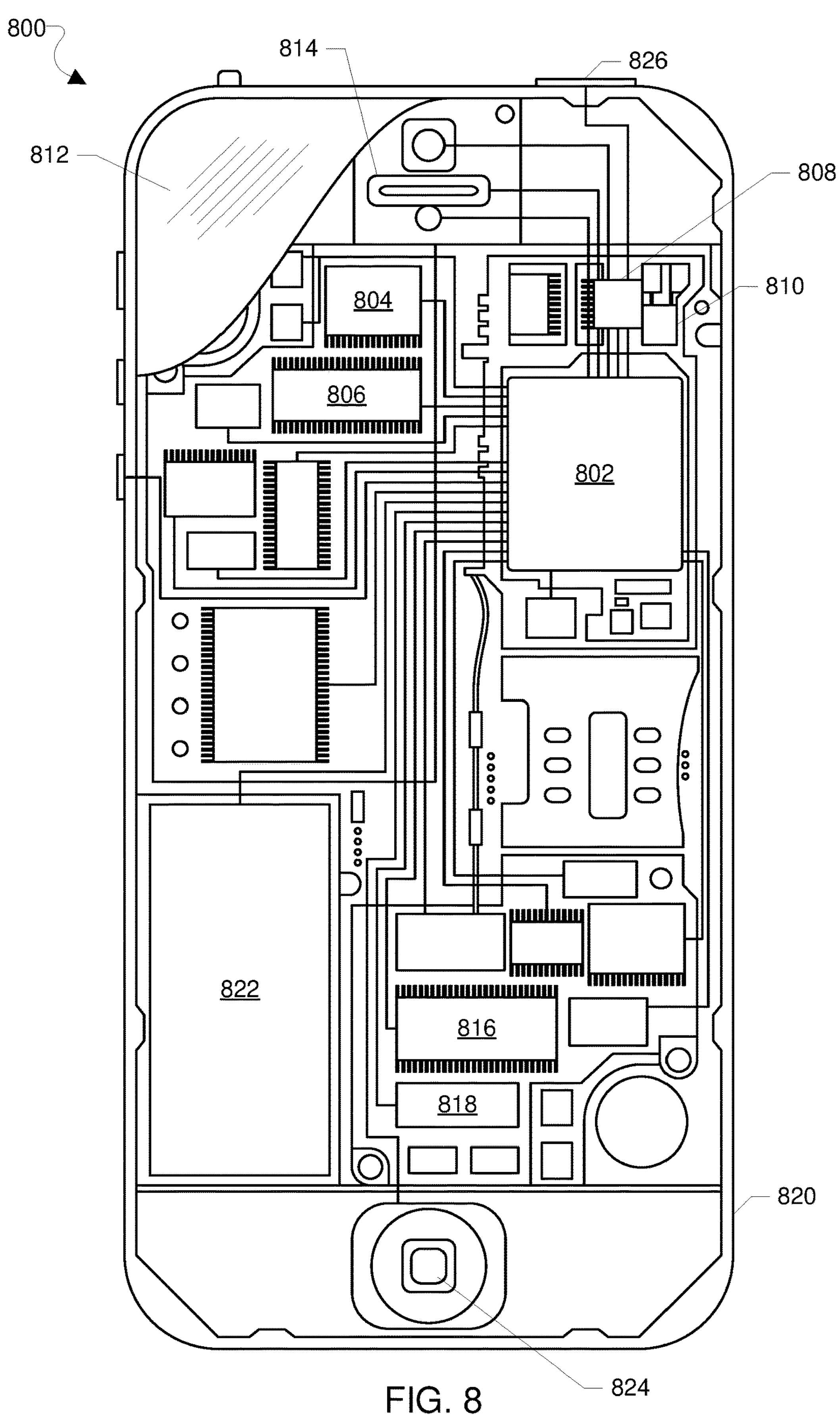
FIG. 8 is a component block diagram illustrating an example mobile computing device suitable for implementing various embodiments.

Various embodiments (including, but not limited to, embodiments described above with reference to FIGS. 1-7B) may be implemented in a wide variety of computing systems including mobile computing devices, an example of which suitable for use with the various embodiments is illustrated in FIG. 8. The mobile computing device 800 may include a processor 802 coupled to a touchscreen controller 804 and an internal memory 806. The processor 802 may be one or more multicore integrated circuits designated for general or specific processing tasks. The internal memory 806 may be volatile or non-volatile memory and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, embedded DRAM, non-volatile flash memory, UFS, SDCC, etc. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the mobile computing device 800 need not have touch screen capability.

The mobile computing device 800 may have one or more radio signal transceivers 808 (e.g., Peanut, Bluetooth, ZigBee, Wi-Fi, RF radio) and antennae 810, for sending and receiving communications, coupled to each other and/or to the processor 802. The transceivers 808 and antennae 810 may be used with the above-mentioned circuitry to implement the various wireless transmission protocol stacks and interfaces. The mobile computing device 800 may include a cellular network wireless modem chip 816 that enables communication via a cellular network and is coupled to the processor 802.

The mobile computing device 800 may include a peripheral device connection interface 818 coupled to the processor 802. The peripheral device connection interface 818 may be singularly configured to accept one type of connection or may be configured to accept various types of physical and communication connections, common or proprietary, such as Universal Serial Bus (USB), Fire Wire, Thunderbolt, or PCIe. The peripheral device connection interface 818 may also be coupled to a similarly configured peripheral device connection port (not shown).

The mobile computing device 800 may also include speakers 814 for providing audio outputs. The mobile computing device 800 may also include a housing 820, constructed of a plastic, metal, or a combination of materials, for containing all or some of the components described herein. The mobile computing device 800 may include a power source 822 coupled to the processor 802, such as a disposable or rechargeable battery. The rechargeable battery may also be coupled to the peripheral device connection port to receive a charging current from a source external to the mobile computing device 800. The mobile computing device 800 may also include a physical button 824 for receiving user inputs. The mobile computing device 800 may also include a power button 826 for turning the mobile computing device 800 on and off.

Figure 9:
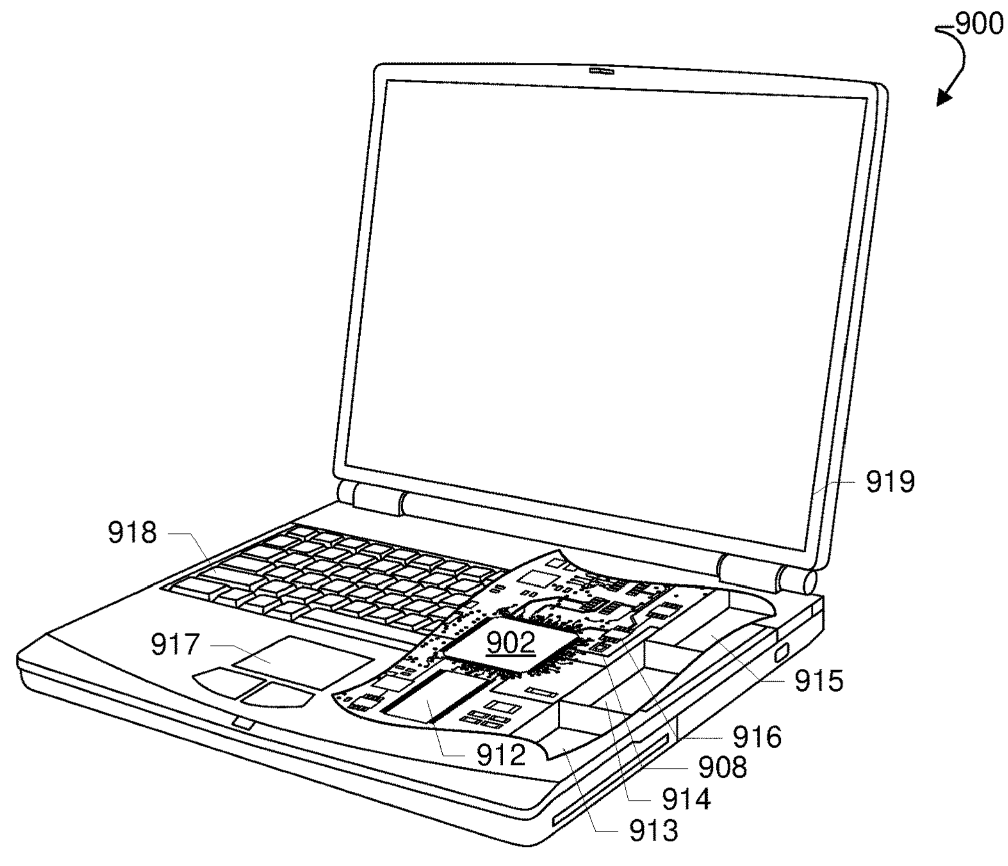
FIG. 9 is a component block diagram illustrating an example mobile computing device suitable for implementing various embodiments.

The various embodiments (including, but not limited to, embodiments described above with reference to FIGS. 1-7B) may be implemented in a wide variety of computing systems including a laptop computer 900 an example of which is illustrated in FIG. 9. Many laptop computers include a touchpad touch surface 917 that serves as the computer's pointing device, and thus may receive drag, scroll, and flick gestures similar to those implemented on computing devices equipped with a touch screen display and described above. A laptop computer 900 will typically include a processor 902 coupled to volatile memory 912 and a large capacity nonvolatile memory, such as a disk drive 913 of Flash memory. Additionally, the computer 900 may have one or more antenna 908 for sending and receiving electromagnetic radiation that may be connected to a wireless data link and/or cellular telephone transceiver 916 coupled to the processor 902. The computer 900 may also include a floppy disc drive 914 and a compact disc (CD) drive 915 coupled to the processor 902. In a notebook configuration, the computer housing includes the touchpad 917, the keyboard 918, and the display 919 all coupled to the processor 902. Other configurations of the computing device may include a computer mouse or trackball coupled to the processor 902 (e.g., via a USB input) as are well known, which may also be used in conjunction with the various embodiments.

Figure 10:
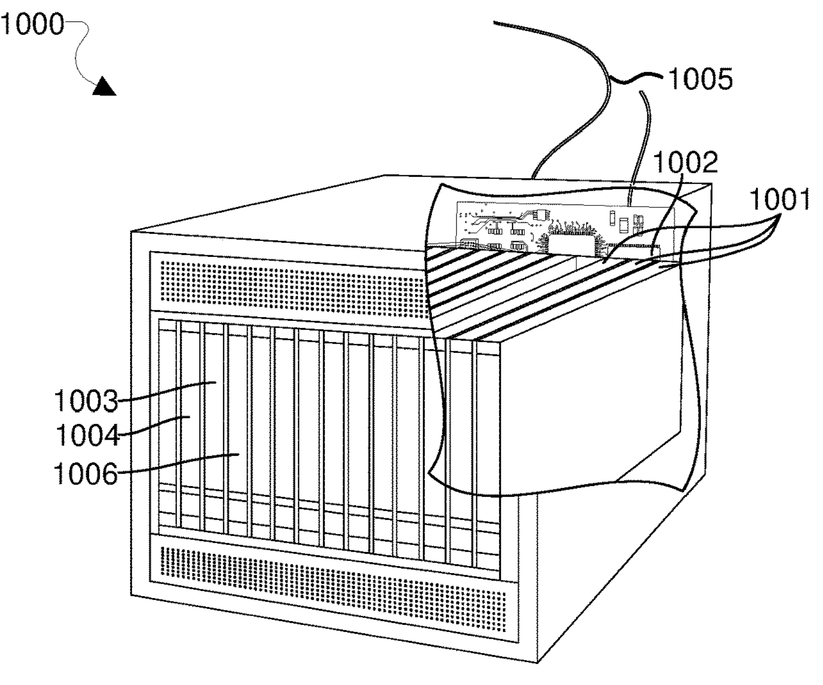
FIG. 10 is a component block diagram illustrating an example server suitable for implementing various embodiments.

The various embodiments (including, but not limited to, embodiments described above with reference to FIGS. 1-7B) may also be implemented in fixed computing systems, such as any of a variety of commercially available servers. An example server 1000 is illustrated in FIG. 10. Such a server 1000 typically includes one or more multicore processor assemblies 1001 coupled to volatile memory 1002 and a large capacity nonvolatile memory, such as a disk drive 1004. As illustrated in FIG. 10, multicore processor assemblies 1001 may be added to the server 1000 by inserting them into the racks of the assembly. The server 1000 may also include a floppy disc drive, compact disc (CD) or digital versatile disc (DVD) disc drive 1006 coupled to the processor 1001. The server 1000 may also include network access ports 1003 coupled to the multicore processor assemblies 1001 for establishing network interface connections with a network 1005, such as a local area network coupled to other broadcast system computers and servers, the Internet, the public switched telephone network, and/or a cellular data network (e.g., CDMA, TDMA, GSM, PCS, 3G, 4G, 5G, LTE, or any other type of cellular data network).

Computer program code or "program code" for execution on a programmable processor for carrying out operations of the various embodiments may be written in a high-level programming language such as C, C++, C #, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Implementation examples are described in the following paragraphs. While some of the following implementation examples are described in terms of example systems, devices, or methods, further example implementations may include: the example systems or devices discussed in the following paragraphs implemented as a method executing operations of the example systems or devices, the example systems, devices, or methods discussed in the following paragraphs implemented by an inline cryptographic device configured to perform operations of the example systems, devices, or methods; the example systems, devices, or methods discussed in the following paragraphs implemented by a computing device comprising a processing device configured with processing device-executable instructions to perform operations of the example systems, devices, or methods; a computing device including means for performing functions of the example systems, devices, or methods; and the example systems, devices, or methods discussed in the following paragraphs implemented as a non-transitory processor-readable storage medium having stored thereon processor-executable instructions configured to cause a processor of a computing device to perform the operations of the example systems, devices, or methods.

Example 1. A method implemented in an inline cryptographic module of a system on chip (SoC) for inline cryptographic core management, including: receiving a cryptographic core configuration request for a data stream of a multi-data stream memory controller; and dynamically configuring at least one cryptographic core for the data stream.

Example 2. The method of example 1, in which the cryptographic core configuration request is a cryptographic core allocation request for the data stream, the method further including: activating an available cryptographic core, in which the available cryptographic core is the at least one cryptographic core; and allocating the at least one cryptographic core to the data stream.

Example 3. The method of example 2, in which activating the available cryptographic core includes setting an activation value of a data structure for the at least one cryptographic core to indicate an active state of the at least one cryptographic core to the multi-data stream memory controller.

Example 4. The method of any of examples 2 or 3, in which allocating the at least one cryptographic core to the data stream includes setting a reference value of a data structure for the at least one cryptographic core to indicate a link to another cryptographic core allocated to the data stream to the multi-data stream memory controller.

Example 5. The method of any of examples 2-4, further including aligning another cryptographic core allocated to the data stream.

Example 6. The method of example 5, in which aligning the another cryptographic core allocated to the data stream includes setting a reference value of a data structure for the another cryptographic core to indicate a link to the at least one cryptographic core to the multi-data stream memory controller.

Example 7. The method of any of examples 1-5, in which the cryptographic core configuration request is a cryptographic core deallocation request for the data stream, the method further including: scanning a plurality of cryptographic cores assigned to the data stream for an indication of an idle state of the at least one cryptographic core; deactivating the at least one cryptographic core; and deallocating the at least one cryptographic core from the data stream.

Example 8. The method of example 7, in which deactivating the at least one cryptographic core includes setting an activation value of a data structure for the at least one cryptographic core to indicate an inactive state of the at least one cryptographic core to the multi-data stream memory controller.

Example 9. The method of any of examples 7 or 8, in which deallocating the at least one cryptographic core from the data stream includes setting a reference value of a data structure for the at least one cryptographic core to indicate a link to no other cryptographic core to the multi-data stream memory controller.

Example 10. The method of any of examples 7-9, further including aligning a first cryptographic core allocated to the data stream.

Example 11. The method of example 10, in which aligning the first cryptographic core allocated to the data stream includes updating a reference value of a data structure for the first cryptographic core configured to indicate a link to the at least one cryptographic core to the multi-data stream memory controller to being configured to indicate a link to a second cryptographic core allocated to the data stream to the multi-data stream memory controller.

The foregoing method descriptions and the process flow diagrams are provided merely as illustrative examples and are not intended to require or imply that the operations of the various embodiments must be performed in the order presented. The order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein but is to be accorded the widest scope consistent with the following claims and the principles and novel features disclosed herein.

What is claimed is:

1. A method implemented in an inline cryptographic module of a system on chip (SoC) for inline cryptographic core management, comprising:

receiving a cryptographic core configuration request for a data stream of a multi-data stream memory controller, wherein each data stream comprises:
- encrypted data to be written to a non-volatile storage memory; or
- decrypted data to be written to a random access memory (RAM) or a cache memory associated with the SoC;

activating a first cryptographic core for encryption or decryption of data associated with the data stream;

allocating the first cryptographic core to the data stream; and pointing a stream current pointer to the first cryptographic core based on the allocating the first cryptographic core, wherein the stream current pointer indicates that a new incoming data block is assigned to the first cryptographic core.

2. The method of claim 1, wherein the cryptographic core configuration request is a cryptographic core allocation request for the data stream, and the first cryptographic core is an available cryptographic core.

3. The method of claim 1, wherein activating the first cryptographic core comprises setting, in a data structure, a first activation value of the first cryptographic core to indicate that the first cryptographic core is in an active state.

4. The method of claim 3, further comprising:

allocating a second cryptographic core to the data stream; and setting, in the data structure, a first reference value of the first cryptographic core to indicate a link to the second cryptographic core.

5. The method of claim 1, further comprising aligning another cryptographic core allocated to the data stream.

6. The method of claim 5, wherein aligning the another cryptographic core allocated to the data stream comprises setting a reference value of a data structure for the another cryptographic core to indicate a link to the first cryptographic core to the multi-data stream memory controller.

7. The method of claim 1, further comprising:

receiving a cryptographic core deallocation request for the data stream;

scanning a plurality of cryptographic cores assigned to the data stream for an indication of an idle state of the first cryptographic core;

deactivating the first cryptographic core; and deallocating the first cryptographic core from the data stream.

8. The method of claim 7, wherein deactivating the first cryptographic core comprises setting, in a data structure, a first activation value of the first cryptographic core to indicate that the first cryptographic core is in an inactive state.

9. The method of claim 7, wherein deallocating the first cryptographic core from the data stream comprises setting, in a data structure, a first reference value of the first cryptographic core to indicate a link to no other cryptographic core.

10. One or more processors, configured to:

receive a cryptographic core configuration request for a data stream of a multi-data stream memory controller, wherein each data stream comprises:

encrypted data to be written to a non-volatile storage memory; or decrypted data to be written to a random access memory (RAM) or a cache memory associated with a system on chip (SoC);

activate first cryptographic core for encryption or decryption of data associated with the data stream;

allocate the first cryptographic core to the data stream; and point a stream current pointer to the first cryptographic core based on the allocating the first cryptographic core, wherein the stream current pointer indicates that a new incoming data block is assigned to the first cryptographic core.

11. The one or more processors of claim 10, wherein the cryptographic core configuration request is a cryptographic core allocation request for the data stream, and the first cryptographic core is an available cryptographic core.

12. The one or more processors of claim 10, wherein the one or more processors are further configured to set, in a data structure, a first activation value of the first cryptographic core to indicate that the first cryptographic core is in an active state.

13. The one or more processors of claim 12, wherein the one or more processors are further configured to;

allocate a second cryptographic core to the data stream; and set, in the data structure, a first reference value of the first cryptographic core to indicate a link to the second cryptographic core.

14. The one or more processors of claim 10, wherein the one or more processors are further configured to align another cryptographic core allocated to the data stream.

15. The one or more processors of claim 14, wherein the one or more processors are further configured to set a reference value of a data structure for the another cryptographic core to indicate a link to the first cryptographic core to the multi-data stream memory controller.

16. The one or more processors of claim 10, the one or more processors being further configured to:

receive a cryptographic core deallocation request for the data stream;

scan a plurality of cryptographic cores assigned to the data stream for an indication of an idle state of the first cryptographic core;

deactivate the first cryptographic core; and deallocate the first cryptographic core from the data stream.

17. The one or more processors of claim 10, wherein the one or more processors are further configured to set, in a data structure, a first activation value of the first cryptographic core to indicate that the first cryptographic core is in an inactive state.

18. The one or more processors of claim 10, wherein the one or more processors are further configured to set, in a data structure, a first reference value of the first cryptographic core to indicate a link to no other cryptographic core.

19. A computing device, comprising:

means for receiving a cryptographic core configuration request for a data stream of a multi-data stream memory controller, wherein each data stream comprises:

encrypted data to be written to a non-volatile storage memory; or decrypted data to be written to a random access memory (RAM) or a cache memory associated with a system on chip (SoC);

means for activating a first cryptographic core for encryption or decryption of data associated with the data stream;

means for allocating the first cryptographic core to the data stream; and means for pointing a stream current pointer to the first cryptographic core based on the allocating the first cryptographic core, wherein the stream current pointer indicates that a new incoming data block is assigned to the first cryptographic core.

20. The computing device of claim 19, wherein the cryptographic core configuration request is a cryptographic core allocation request for the data stream, and the first cryptographic core is an available cryptographic core.

21. The computing device of claim 19, wherein:

means for activating the first cryptographic core comprises means for setting, in a data structure, a first activation value of the first cryptographic core to indicate that the first cryptographic core is in an active state.

22. The computing device of claim 21, further comprising:

means for allocating a second cryptographic core to the data stream; and means for setting, in the data structure, a first reference value of the first cryptographic core to indicate a link to the second cryptographic core.

23. The computing device of claim 19, further comprising:

means for receiving a cryptographic core deallocation request for the data stream;

means for scanning a plurality of cryptographic cores assigned to the data stream for an indication of an idle state of the first cryptographic core;

means for deactivating the first cryptographic core; and means for deallocating the first cryptographic core from the data stream.

24. The computing device of claim 23, wherein:

means for deactivating the first cryptographic core comprises means for setting, in a data structure, a first activation value of the first cryptographic core to indicate that the first cryptographic core is in an inactive state; and means for deallocating the first cryptographic core from the data stream comprises means for setting, in the data structure, a first reference value of the first cryptographic core to indicate a link to no other cryptographic core.

* * * * *